(12) United States Patent
Hutton et al.

(10) Patent No.: US 6,513,066 B1
(45) Date of Patent: *Jan. 28, 2003

(54) ESTABLISHING A POINT-TO-POINT INTERNET COMMUNICATION

(75) Inventors: Glenn W. Hutton, Miami, FL (US); Shane D. Mattaway, Boca Raton, FL (US); Craig B. Strickland, Tamarac, FL (US)

(73) Assignee: Netspeak Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/407,270

(22) Filed: Sep. 29, 1999

Related U.S. Application Data

(63) Continuation of application No. 08/533,115, filed on Sep. 25, 1995, now Pat. No. 6,108,704.

(51) Int. Cl.[7] .............................................. G06F 13/00
(52) U.S. Cl. ........................ 709/227; 709/238; 709/245
(58) Field of Search ................................. 709/206, 227, 709/228, 230, 238, 245, 249, 313

(56) References Cited

U.S. PATENT DOCUMENTS 5,651,006 A * 7/1997 Fujino et al. ............... 370/408
6,188,677 B1 * 2/2001 Oyama et al. .............. 370/271

* cited by examiner

Primary Examiner—Viet D. Vu
(74) Attorney, Agent, or Firm—Kenyon &Kenyon

(57) ABSTRACT

A point-to-point Internet protocol exchanges Internet Protocol (IP) addresses between processing units to establish a point-to-point communication link between the processing units through the Internet. A first point-to-point Internet protocol includes the steps of (a) storing in a database a respective IP address of a set of processing units that have an on-line status with respect to the Internet; (b) transmitting a query from a first processing unit to a connection server to determine the on-line status of a second processing unit; and (c) retrieving the IP address of the second unit from the database using the connection server, in response to the determination of a positive on-line status of the second processing unit, for establishing a point-to-point communication link between the first and second processing units through the Internet. A second point-to-point Internet protocol includes the steps of (a) transmitting an E-mail signal, including a first IP address, from a first processing unit; (b) processing the E-mail signal through the Internet to deliver the E-mail signal to a second processing unit; and (c) transmitting a second IP address to the first processing unit for establishing a point-to-point communication link between the first and second processing units through the Internet.

15 Claims, 6 Drawing Sheets

ESTABLISHING A POINT-TO-POINT INTERNET COMMUNICATION

RELATED APPLICATIONS

This application is a continuation application of U.S. patent application Ser. No. 08/533,115, filed Sep. 25, 1995, by Glen W. Hutton et al. and entitled POINT-TO-POINT INTERNET PROTOCOL, which issued as U.S. Pat. No. 6,108,704.

BACKGROUND OF THE INVENTION

1. Field of the Invention

This disclosure relates to network communication protocols, and in particular to a point-to-point protocol for use with the Internet.

2. Description of the Related Art

The increased popularity of on-line services such as AMERICA ONLINE™, COMPUSERVE®, and other services such as Internet gateways have spurred applications to provide multimedia, including video and voice clips, to online users. An example of an online voice clip application is VOICE E-MAIL FOR WINCIM and VOICE E-MAIL FOR AMERICA ONLINE™, available from Bonzi Software, as described in "Simple Utilities Send Voice E-Mail Online", MULTIMEDIA WORLD, VOL. 2, NO. 9, August 1995, p. 52. Using such Voice E-Mail software, a user may create an audio message to be sent to a predetermined E-mail address specified by the user.

Generally, devices interfacing to the Internet and other online services may communicate with each other upon establishing respective device addresses. One type of device address is the Internet Protocol (IP) address, which acts as a pointer to the device associated with the IP address. A typical device may have a Serial Line Internet Protocol or Point-to-Point Protocol (SLIP/PPP) account with a permanent IP address for receiving e-mail, voicemail, and the like over the Internet. E-mail and voicemail is generally intended to convey text, audio, etc., with any routing information such as an IP address and routing headers generally being considered an artifact of the communication, or even gibberish to the recipient.

Devices such as a host computer or server of a company may include multiple modems for connection of users to the Internet, with a temporary IP address allocated to each user. For example, the host computer may have a general IP address XXX.XXX.XXX, and each user may be allocated a successive IP address of XXX.XXX.XXX.10, XXX.XXX.XXX.11, XXX.XXX XXX.12, etc. Such temporary IP addresses may be reassigned or recycled to the users, for example, as each user is successively connected to an outside party. For example, a host computer of a company may support a maximum of 254 IP addresses which are pooled and shared between devices connected to the host computer.

Permanent IP addresses of users and devices accessing the Internet readily support point-to-point communications of voice and video signals over the Internet. For example, realtime video teleconferencing has been implemented using dedicated IP addresses and mechanisms known as reflectors. Due to the dynamic nature of temporary IP addresses of some devices accessing the Internet, point-to-point communications in realtime of voice and video have been generally difficult to attain.

SUMMARY OF THE INVENTION

A point-to-point Internet protocol is disclosed which exchanges Internet Protocol (IP) addresses between processing units to establish a point-to-point communication link between the processing units through the Internet.

A first point-to-point Internet protocol is disclosed which includes the steps of:
  (a) storing in a database a respective IP address of a set of processing units that have an on-line status with respect to the Internet;
  (b) transmitting a query from a first processing unit to a connection server to determine the on-line status of a second processing unit; and
  (c) retrieving the IP address of the second unit from the database using the connection server, in response to the determination of a positive on-line status of the second processing unit, for establishing a point-to-point communication link between the first and second processing units through the Internet.

A second point-to-point Internet protocol is disclosed, which includes the steps of:
  (a) transmitting an E-mail signal, including a first IP address, from a first processing unit;
  (b) processing the E-mail signal through the Internet to deliver the E-mail signal to a second processing unit; and
  (c) transmitting a second IP address to the first processing unit for establishing a point-to-point communication link between the first and second processing units through the Internet.

BRIEF DESCRIPTION OF THE DRAWINGS

The features of the disclosed point-to-point Internet protocol and system will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
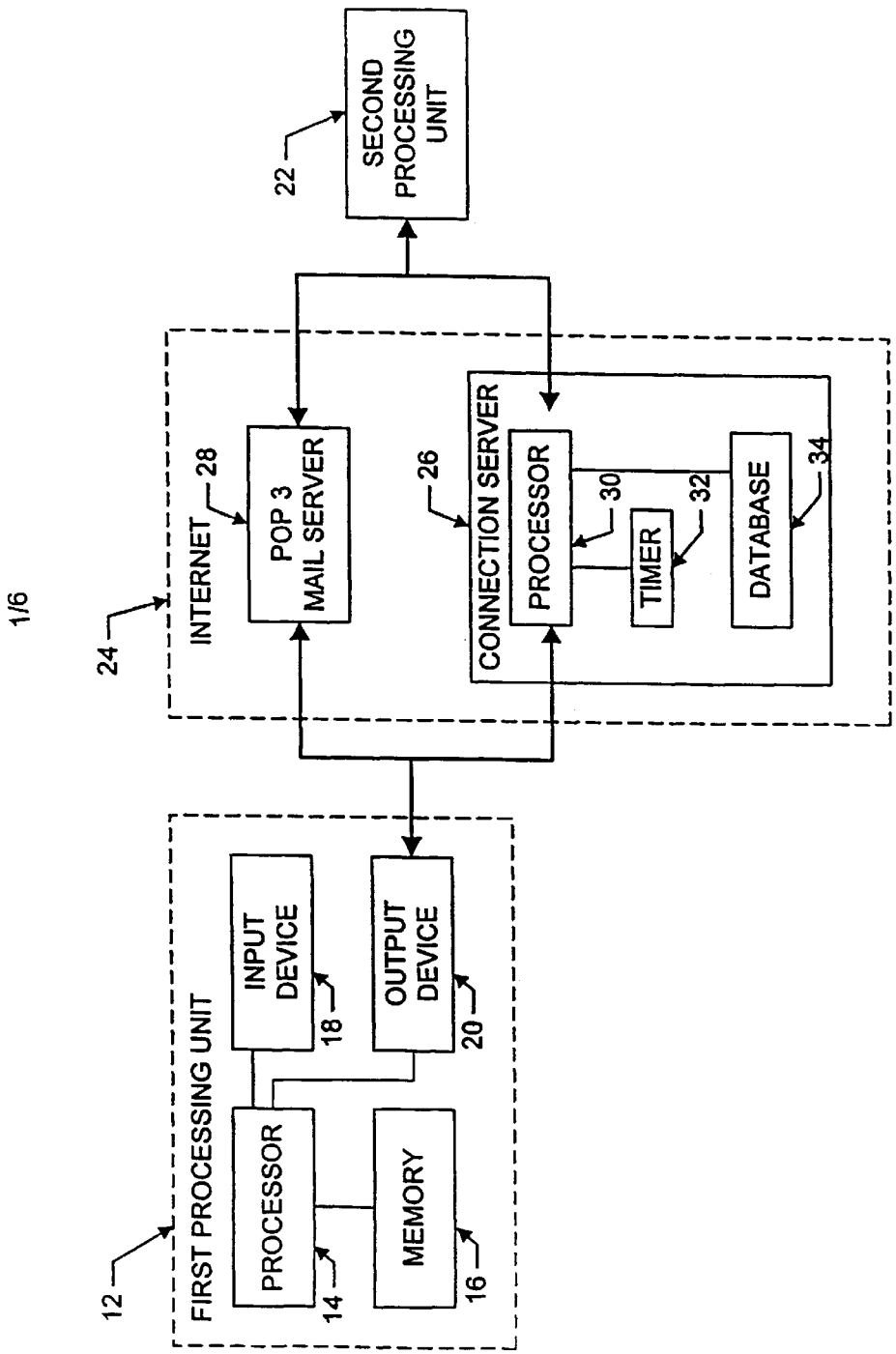
FIG. 1 illustrates, in block diagram format, a system for the disclosed point-to-point Internet protocol.

Referring now in specific detail to the drawings, with like reference numerals identifying similar or identical elements, as shown in FIG. 1, the present disclosure describes a point-to-point Internet protocol and system 10 for using such a protocol.

In an exemplary embodiment, the system 10 includes a first processing unit 12 for sending at least a voice signal from a first user to a second user. The first processing unit 12 includes a processor 14, a memory 16, an input device 18, and an output device 20. The output device 20 includes at least one modem capable of, for example, 14.4 kbaud communications and operatively connected via wired and/or wireless communication connections to the Internet. One skilled in the art would understand that the input device 18 may be implemented at least in part by the modem of the output device 20 to allow input signals from the communication connections to be received. The second processing unit 22 may have a processor, memory, and input and output devices, including at least one modem and associated communication connections, as described above for the first processing unit 12. In an exemplary embodiment, each of the processing units 12, 22 may be a WEBPHONE™ unit, available from Net Speak corporation, Boca Raton, Fla. capable of operating the disclosed point-to-point Internet protocol and system 10, as described herein.

The first processing unit 12 and the second processing unit 22 are operatively connected to the Internet 24 by communication devices and software known in the art. The processing units 12, 22 may be operatively interconnected through the Internet 24 to a connection server 26, and may also be operatively connected to a mail server 28 associated with the Internet 24.

The connection server 26 includes a processor 30, a timer 32 for generating timestamps, and a memory such as a database 34 for storing, for example, E-mail and Internet Protocol (IP) addresses of logged-in units. In an exemplary embodiment, the connection server 26 may be a SPARC 5 server or a SPARC 20 server, available from SUN MICROSYSTEMS, INC., Mountain View, Calif., having a central processing unit (CPU) as processor 30 operating an operating system (OS) such as UNIX and providing timing operations such as maintaining the timer 32, a hard drive or fixed drive as well as dynamic random access memory (DRAM) for storing the database 34, and a keyboard and display and/or other input and output devices (not shown in FIG. 1). The database 34 may be an SQL database available from ORACLE or INFOMIX.

In an exemplary embodiment, the mail server 28 may be a Post Office Protocol (POP) Version 3 mail server including a processor, memory, and stored programs operating in a UNIX environment, or alternatively another OS, to process E-mail capabilities between processing units and devices over the Internet 24.

The first processing unit 12 may operate the disclosed point-to-point Internet protocol by a computer program described hereinbelow in conjunction with FIG. 6, which may be implemented from compiled and/or interpreted source code in the C++ programming language and which may be downloaded to the first processing unit 12 from an external computer. The operating computer program may be stored in the memory 16, which may include about 8 MB RAM and/or a hard or fixed drive having about 8 MB. Alternatively, the source code may be implemented in the first processing unit 12 as firmware, as an erasable read only memory (EPROM), etc. It is understood that one skilled in the art would be able to use programming languages other than C++ to implement the disclosed point-to-point Internet protocol and system 10.

The processor 14 receives input commands and data from a first user associated with the first processing unit 12 through the input device 18, which may be an input port connected by a wired, optical, or a wireless connection for electromagnetic transmissions, or alternatively may be transferable storage media, such as floppy disks, magnetic tapes, compact disks, or other storage media including the input data from the first user.

The input device 18 may include a user interface (not shown) having, for example, at least one button actuated by the user to input commands to select from a plurality of operating modes to operate the first processing unit 12. In alternative embodiments, the input device 18 may include a keyboard, a mouse, a touch screen, and/or a data reading device such as a disk drive for receiving the input data from input data files stored in storage media such as a floppy disk or, for example, an 8 mm storage tape. The input device 18 may alternatively include connections to other computer systems to receive the input commands and data therefrom.

The first processing unit 12 may include a visual interface as the output device 20 for use in conjunction with the input device 18 and embodied as one of the screens illustrated by the examples shown in FIGS. 5–6 and discussed below. It is also understood that alternative input devices may be used in conjunction with alternative output devices to receive commands and data from the user, such as keyboards, mouse devices, and graphical user interfaces (GUI) such as WINDOWS™ 3.1 available from MICROSOFT™ Corporation Redmond, Wash., executed by the processor 14 using, for example, DOS 5.0. One skilled in the art would understand that other operating systems and GUIs, such as OS/2 and OS/2 WARP, available from IBM CORPORATION, Boca Raton, Fla. may be used. Other alternative input devices may include microphones and/or telephone handsets for receiving audio voice data and commands, with the first processing unit 12 including speech or voice recognition devices, dual tone multi-frequency (DTMF) based devices, and/or software known in the art to accept voice data and commands and to operate the first processing unit 12.

Figure 4:
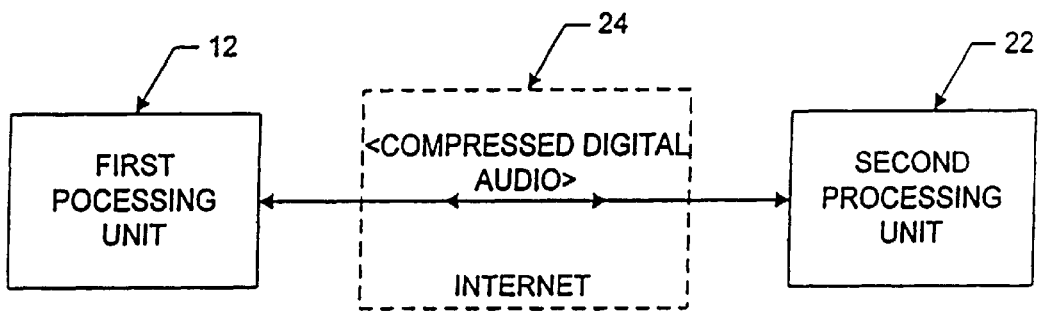
FIG. 4 is another block diagram of the system of FIGS. 1–2 with audio communications being conducted.
Figures 5, 6:
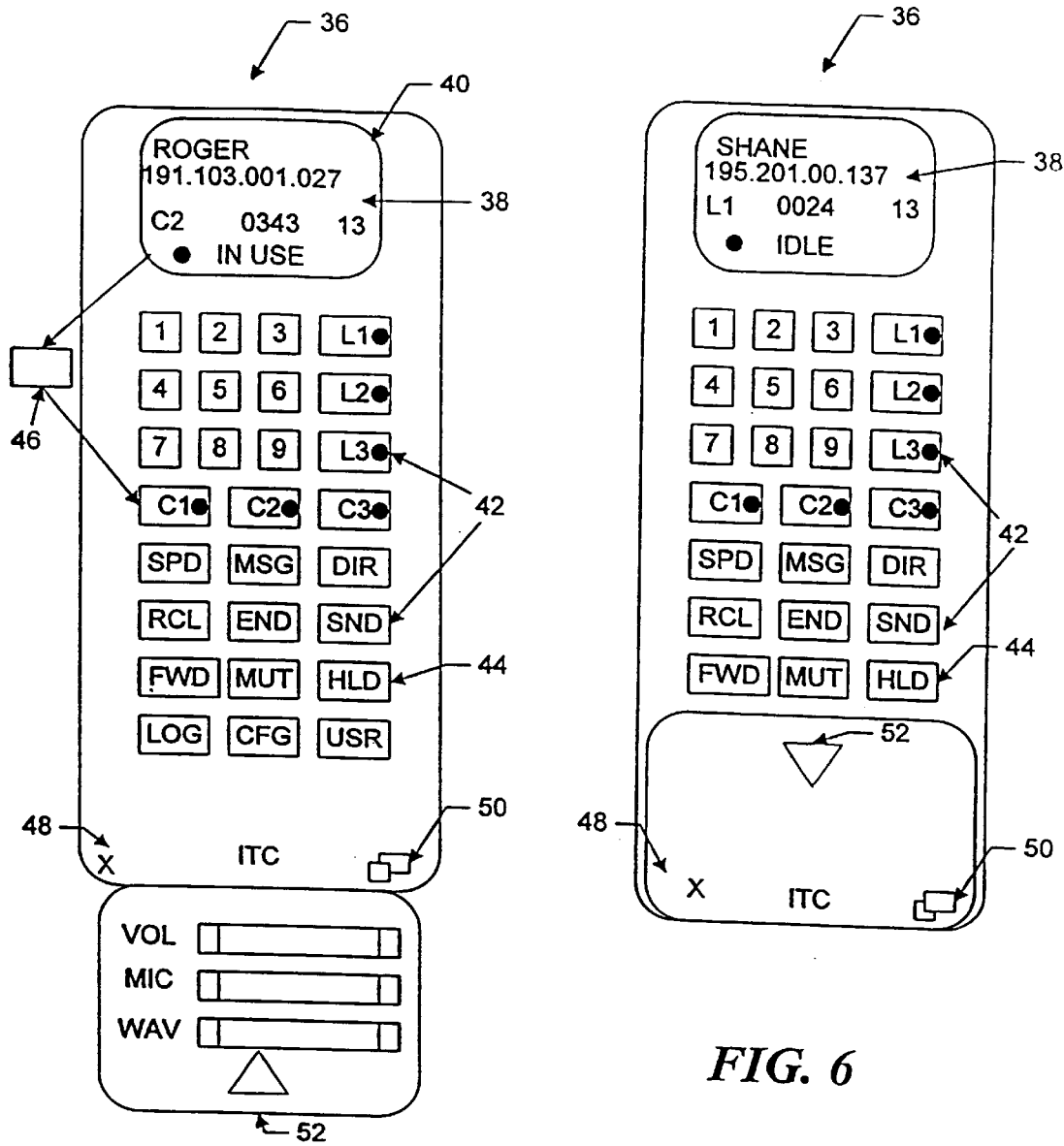
FIG. 5 illustrates a display screen for a processing unit.
FIG. 6 illustrates another display screen for a processing unit.

In addition, either of the first processing unit 12 and the second processing unit 22 may be implemented in a personal digital assistant (PDA) providing modem and E-mail capabilities and Internet access, with the PDA providing the input/output screens for mouse interaction or for touchscreen activation as shown, for example, in FIGS. 4–5, as a combination of the input device 18 and output device 20.

For clarity of explanation, the illustrative embodiment of the disclosed point-to-point Internet protocol and system 10 is presented as having individual functional blocks, which may include functional blocks labelled as "processor" and "processing unit". The functions represented by these blocks may be provided through the use of either shared or dedicated hardware, including, but not limited to, hardware capable of executing software. For example, the functions of each of the processors and processing units presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

The processing units 12, 22 are capable of placing calls and connecting to other processing units connected to the Internet 24, for example, via dialup SLIP/PPP lines. In an exemplary embodiment, each processing unit assigns an unsigned long session number, for example, a 32-bit long sequence in a *.ini file for each call. Each call may be assigned a successive session number in sequence, which may be used by the respective processing unit to associate the call with one of the SLIP/PPP lines, to associate a <ConnectOK> response signal with a <ConnectRequest> signal, and to allow for multiplexing and demultiplexing of inbound and outbound conversations on conference lines.

For callee (or called) processing units with fixed IP addresses, the caller (or calling) processing unit may open a "socket", i.e. a file handle or address indicating where data is to be sent, and transmit a <Call> command to establish communication with the callee utilizing, for example, datagram services such as Internet Standard network layering as well as transport layering, which may include a Transport Control Protocol (TCP) or a User Datagram Protocol (UDP) on top of the IP. Typically, a processing unit having a fixed IP address may maintain at least one open socket and a called processing unit waits for a <Call> command to assign the open socket to the incoming signal. If all lines are in use, the callee processing unit sends a BUSY signal or message to the caller processing unit.

As shown in FIG. 1, the disclosed point-to-point Internet protocol and system 10 operate when a callee processing unit does not have a fixed or predetermined IP address. In the exemplary embodiment and without loss of generality, the first processing unit 12 is the caller processing unit and the second processing unit 22 is the called processing unit.

When either of processing units 12, 22 logs on to the Internet via a dial-up connection, the respective unit is provided a dynamically allocated IP address by a connection service provider.

Upon the first user initiating the point-to-point Internet protocol when the first user is logged on to the Internet 24, the first processing unit 12 automatically transmits its associated E-mail address and its dynamically allocated IP address to the connection server 26. The connection server 26 then stores these addresses in the database 34 and timestamps the stored addresses using timer 32. The first user operating the first processing unit 12 is thus established in the database 34 as an active on-line party available for communication using the disclosed point-to-point Internet protocol. Similarly, a second user operating the second processing unit 22, upon connection to the Internet 24 through a connection service provider, is processed by the connection server 26 to be established in the database 34 as an active on-line party.

The connection server 26 may use the timestamps to update the status of each processing unit; for example, after 2 hours, so that the on-line status information stored in the database 34 is relatively current. Other predetermined time periods, such as a default value of 24 hours, may be configured by a systems operator.

The first user with the first processing unit 12 initiates a call using, for example, a Send command and/or a command to speeddial an $N^{TH}$ stored number, which may be labelled [SND] and [SPD][N], respectively, by the input device 18 and/or the output device 20, such as shown in FIGS. 5–6. In response to either the Send or speeddial commands, the first processing unit 12 retrieves from memory 16 a stored E-mail address of the callee corresponding to the $N^{TH}$ stored number. Alternatively, the first user may directly enter the E-mail address of the callee.

The first processing unit 12 then sends a query, including the E-mail address of the callee, to the connection server 26. The connection server 26 then searches the database 34 to determine whether the callee is logged-in by finding any stored information corresponding to the callee's E-mail address indicating that the callee is active and on-line. If the callee is active and on-line, the connection server 26 then performs the primary point-to-point Internet protocol; i.e. the IP address of the callee is retrieved from the database 34 and sent to the first processing unit 12. The first processing unit 12 may then directly establish the point-to-point Internet communications with the callee using the IP address of the callee.

If the callee is not on-line when the connection server 26 determines the callee's status, the connection server 26 sends an OFF-LINE signal or message to the first processing unit 12. The first processing unit 12 may also display a message such as "Called Party Off-Line" to the first user.

When a user logs off or goes off-line from the Internet 24, the connection server 26 updates the status of the user in the database 34; for example, by removing the user's information, or by flagging the user as being off-line. The connection server 26 may be instructed to update the user's information in the database 34 by an off-line message, such as a data packet, sent automatically from the processing unit of the user prior to being disconnected from the connection server 26. Accordingly, an off-line user is effectively disabled from making and/or receiving point-to-point Internet communications.

Figure 2:
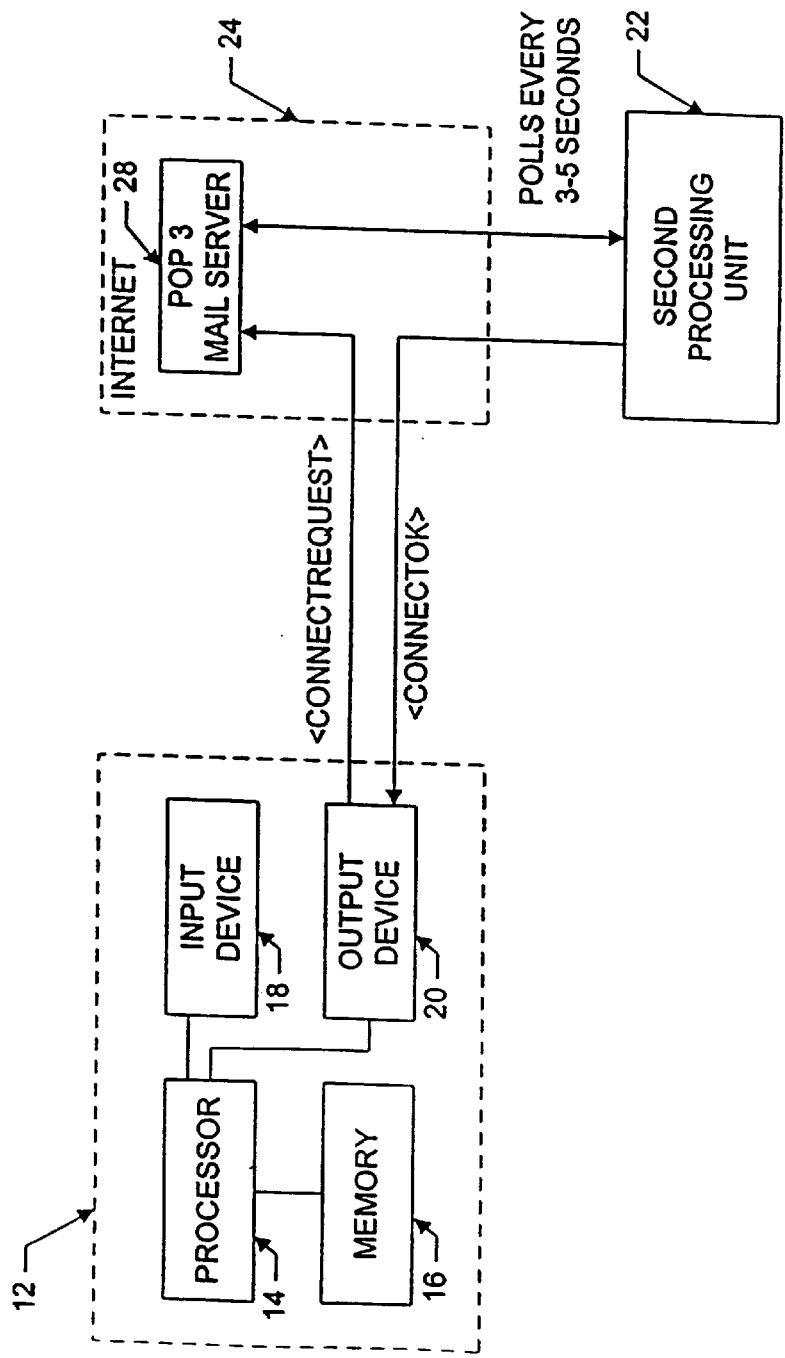
FIG. 2 illustrates, in block diagram format, the system using a secondary point-to-point Internet protocol.
Figure 3:
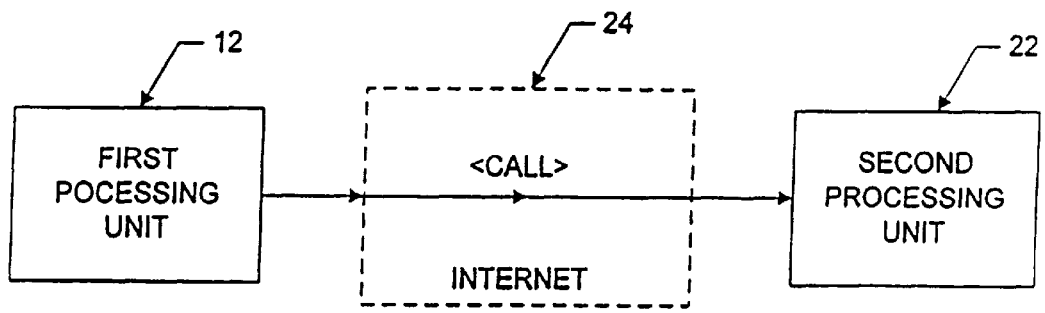
FIG. 3 illustrates, in block diagram format, the system of FIGS. 1–2 with the point-to-point Internet protocol established.

As shown in FIGS. 2–4, the disclosed secondary point-to-point Internet protocol may be used as an alternative to the primary point-to-point Internet protocol described above, for example, if the connection server 26 is non-responsive, inoperative, and/or unable to perform the primary point-to-point Internet protocol, as a non-responsive condition. Alternatively, the disclosed secondary point-topoint Internet protocol may be used independent of the primary point-to-point Internet protocol. In the disclosed secondary point-to-point Internet protocol, the first processing unit 12 sends a <ConnectRequest> message via E-mail over the Internet 24 to the mail server 28. The E-mail including the <ConnectRequest> message may have, for example, the subject

[*wp#XXXXXXXX#nnn.nnn.nnn.nnn#emailAddr]

where nnn.nnn.nnn.nnn is the current (i.e. temporary or permanent) IP address of the first user, and XXXXXXXX is a session number, which may be unique and associated with the request of the first user to initiate point-to-point communication with the second user.

As described above, the first processing unit 12 may send the <ConnectRequest> message in response to an unsuccessful attempt to perform the primary point-to-point Internet protocol. Alternatively, the first processing unit 12 may send the <ConnectRequest> message in response to the first user initiating a SEND command or the like.

After the <ConnectRequest> message via E-mail is sent, the first processing unit 12 opens a socket and waits to detect a response from the second processing unit 22. A timeout timer, such as timer 32, may be set by the first processing unit 12, in a manner known in the art, to wait for a predetermined duration to receive a <ConnectOK>signal. The processor 14 of the first processing unit 12 may cause the output device 20 to output a Ring signal to the user, such as an audible ringing sound, about every 3 seconds. For example, the processor 14 may output a *.wav file, which may be labelled RING.WAV, which is processed by the output device 20 to output an audible ringing sound.

The mail server 28 then polls the second processing unit 22, for example, every 3–5 seconds, to deliver the E-mail. Generally, the second processing unit 22 checks the incoming lines, for example, at regular intervals to wait for and to detect incoming E-mail from the mail server 28 through the Internet 24.

Typically, for sending E-mail to users having associated processing units operatively connected to a host computer or server operating an Internet gateway, E-Mail for a specific user may be sent over the Internet 24 and directed to the permanent IP address or the SLIP/PPP account designation of the host computer, which then assigns a temporary IP address to the processing unit of the specified user for properly routing the E-mail. The E-mail signal may include a name or other designation such as a username which identifies the specific user regardless of the processing unit assigned to the user; that is, the host computer may track and store the specific device where a specific user is assigned or logged on, independent of the IP address system, and so the host computer may switch the E-mail signal to the device of the specific user. At that time, a temporary IP address may be generated or assigned to the specific user and device.

Upon detecting and/or receiving the incoming E-mail signal from the first processing unit 12, the second processing unit 22 may assign or may be assigned a temporary IP address. Therefore, the delivery of the E-mail through the Internet 24 provides the second processing unit 22 with a session number as well as IP addresses of both the first processing unit 12 and the second processing unit 22.

Point-to-point communication may then be established by the processing units 12, 22. For example, the second processing unit 22 may process the E-mail signal to extract the <ConnectRequest> message, including the IP address of the first processing unit 12 and the session number. The second processing unit 22 may then open a socket and generate a <ConnectOK> response signal, which includes the temporary IP address of the second processing unit 22 as well as the session number.

The second processing unit 22 sends the <ConnectoK> signal directly over the Internet 24 to the IP address of the first processing unit 12 without processing by the mail server 28, and a timeout timer of the second processing unit 22 may be set to wait and detect a <Call> signal expected from the first processing unit 12.

Realtime point-to-point communication of audio signals over the Internet 24, as well as video and voicemail, may thus be established and supported without requiring permanent IP addresses to be assigned to either of the users or processing units 12, 22. For the duration of the realtime point-to-point link, the relative permanence of the current IP addresses of the processing units 12, 22 is sufficient, whether the current IP addresses were permanent (i.e. predetermined or preassigned) or temporary (i.e. assigned upon initiation of the point-to-point communication).

In the exemplary embodiment, a first user operating the first processing unit 12 is not required to be notified by the first processing unit 12 that an E-mail is being generated and sent to establish the point-to-point link with the second user at the second processing unit 22. Similarly, the second user is not required to be notified by the second processing unit 22 that an E-mail has been received and/or a temporary IP address is associated with the second processing unit 22. The processing units 12, 22 may perform the disclosed point-to-point Internet protocol automatically upon initiation of the point-to-point communication command by the first user without displaying the E-mail interactions to either user. Accordingly, the disclosed point-to-point Internet protocol may be transparent to the users. Alternatively, either of the first and second users may receive, for example, a brief message of "CONNECTION IN PROGRESS" or the like on a display of the respective output device of the processing units 12, 22.

After the initiation of either the primary or the secondary point-to-point Internet protocols described above in conjunction with FIGS. 1–2, the point-to-point communication link over the Internet 24 may be established as shown in FIGS. 3–4 in a manner known in the art. For example, referring to FIG. 3, upon receiving the <ConnectoK>signal from the second processing unit 22, the first processing unit 12 extracts the IP address of the second processing unit 22 and the session number, and the session number sent from the second processing unit 22 is then checked with the session number originally sent from the first processing unit 12 in the <ConnectRequest> message as E-mail. If the session numbers sent and received by the processing unit 12 match, then the first processing unit 12 sends a <Call> signal directly over the Internet 24 to the second processing unit 22; i.e. using the IP address of the second processing unit 22 provided to the first processing unit 12 in the <ConnectOK> signal.

Upon receiving the <Call> signal, the second processing unit 22 may then begin a ring sequence, for example, by indicating or annunciating to the second user that an incoming call is being received. For example, the word "CALL" may be displayed on the output device of the second processing unit 22. The second user may then activate the second processing unit 22 to receive the incoming call.

Referring to FIG. 4, after the second processing unit 22 receives the incoming call, realtime audio and/or video conversations may be conducted in a manner known in the art between the first and second users through the Internet 24, for example, by compressed digital audio signals. Each of the processing units 12, 22 may also display to each respective user the words "IN USE" to indicate that the point-to-point communication link is established and audio or video signals are being transmitted.

In addition, either user may terminate the point-to-point communication link by, for example, activating a termination command, such as by activating an [END] button or icon on a respective processing unit, causing the respective processing unit to send an <End> signal which causes both processing units to terminate the respective sockets, as well as to perform other cleanup commands and functions known in the art.

FIGS. 5–6 illustrate examples of display screens 36 which may be output by a respective output device of each processing unit 12, 22 of FIGS. 1–4 for providing the disclosed point-to-point Internet protocol and system 10. Such display screens may be displayed on a display of a personal computer (PC) or a PDA in a manner known in the art.

As shown in FIG. 5, a first display screen 36 includes a status area 38 for indicating, for example, a called user by name and/or by IP address or telephone number; a current function such as C2; a current time; a current operating status such as "IN USE", and other control icons such as a down arrow icon 40 for scrolling down a list of parties on a current conference line. The operating status may include such annunciators as "IN USE", "IDLE", "BUSY", "NO ANSWER", "OFFLINE", "CALL", "DIALING", "MESSAGES", and "SPEEDDIAL".

Other areas of the display screen 36 may include activation areas or icons for actuating commands or entering data. For example, the display screen 36 may include a set of icons 42 arranged in columns and rows including digits 0–9 and commands such as END, SND, HLD, etc. For example, the END and SND commands may be initiated as described above, and the HLD icon 44 may be actuated to place a current line on hold. Such icons may also be configured to substantially simulate a telephone handset or a cellular telephone interface to facilitate ease of use, as well as to simulate function keys of a keyboard. For example, icons labelled L1–L4 may be mapped to function keys F1–F4 on standard PC keyboards, and icons C1–C3 may be mapped to perform as combinations of function keys, such as CTRL-F1, CTRL-F2, and CTRL-F3, respectively. In addition, the icons labelled L1–L4 and C1–C3 may include circular regions which may simulate light emitting diodes (LEDs) which indicate that the function or element represented by the respective icon is active or being performed.

Icons L1–L4 may represent each of 4 lines available to the caller, and icons C1–C3 may represent conference calls using at least one line to connect, for example, two or more parties in a conference call. The icons L1–L4 and C1–C3 may indicate the activity of each respective line or conference line. For example, as illustrated in FIG. 5, icons L1–L2 may have lightly shaded or colored circles, such as a green circle, indicating that each of lines 1 and 2 are in use, while icons L3–L4 may have darkly shaded or color circles, such as a red or black circle, indicating that each of lines 3 and 4 are not in use. Similarly, the lightly shaded circle of the icon labelled C2 indicates that the function corresponding to C2 is active, as additionally indicated in the status area 38, while darkly shaded circles of icons labelled C1 and C3 indicate that such corresponding functions are not active.

The icons 42 are used in conjunction with the status area 38. For example, using a mouse for input, a line that is in use as indicated by the lightly colored circle of the icon may be activated to indicate a party's name by clicking a right mouse button for 5 seconds until another mouse click is actuated or the [ESC] key or icon is actuated. Thus, the user may switch between multiple calls in progress on respective lines.

Using the icons as well as an input device such as a mouse, a user may enter the name or alias or IP address, if known, of a party to be called by either manually entering the name, by using the speeddial feature, or by double clicking on an entry in a directory stored in the memory, such as the memory 16 of the first processing unit 12, where the directory entries may be scrolled using the status area 38 and the down arrow icon 40.

Once a called party is listed in the status area 38 as being active on a line, the user may transfer the called party to another line or a conference line by clicking and dragging the status area 38, which is represented by a reduced icon 46. Dragging the reduced icon 46 to any one of line icons L1–L4 transfers the called party in use to the selected line, and dragging the reduced icon 46 to any one of conference line icons C1–C3 adds the called party to the selected conference call.

Other features may be supported, such as icons 48–52, where icon 48 corresponds to, for example, an ALT-X command to exit the communication facility of a processing unit, and icon 50 corresponds to, for example, an ALT-M command to minimize or maximize the display screen 36 by the output device of the processing unit. Icon 52 corresponds to an OPEN command, which may, for example, correspond to pressing the o key on a keyboard, to expand or contract the display screen 36 to represent the opening and closing of a cellular telephone. An "opened" configuration is shown in FIG. 5, and a "closed" configuration is shown in FIG. 6. In the "opened" configuration, additional features such as output volume (VOL) controls, input microphone (MIC) controls, waveform (WAV) sound controls, etc.

The use of display screens such as those shown in FIGS. 5–6 provided flexibility in implementing various features available to the user. It is to be understood that additional features such as those known in the art may be supported by the processing units 12, 22.

Alternatively, it is to be understood that one skilled in the art may implement the processing units 12, 22 to have the features of the display screens in FIGS. 5–6 in hardware; i.e. a wired telephone or wireless cellular telephone may include various keys, LEDs, liquid crystal displays (LCDs), and touchscreen actuators corresponding to the icons and features shown in FIGS. 5–6. In addition, a PC may have the keys of a keyboard and mouse mapped to the icons and features shown in FIGS. 5–6.

Figure 7:
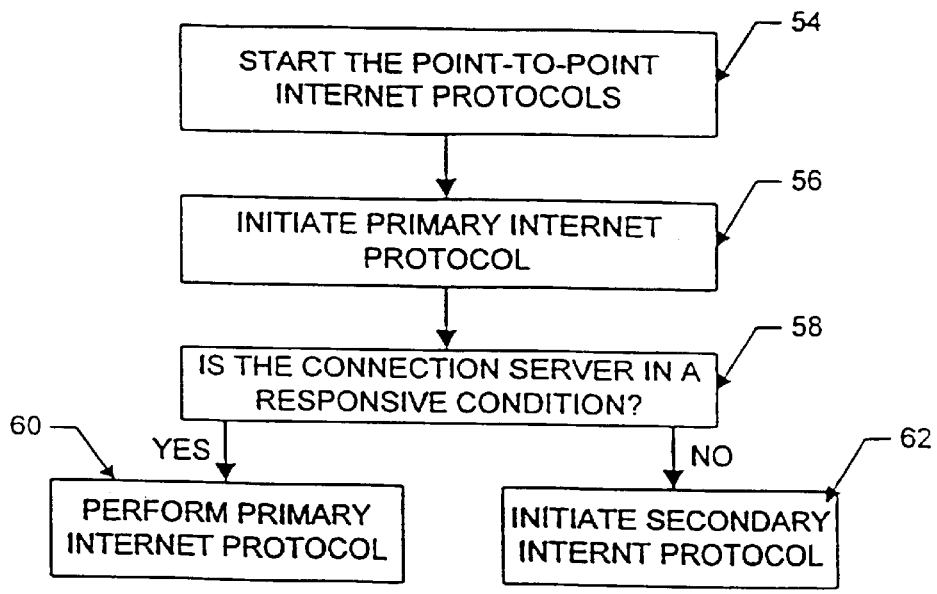
FIG. 7 illustrates a flowchart of the initiation of the point-to-point Internet protocols.

Referring to FIG. 7, the disclosed point-to-point Internet protocol and system 10 is initiated at a first processing unit 12 for point-to-point Internet communications by starting the point-to-point Internet protocols in step 54; initiating the primary point-to-point Internet protocol in step 56 by sending a query from the first processing unit 12 to the connection server 26; determining if the connection server 26 is operative to perform the point-to-point Internet protocol in step 58 by receiving, at the first processing unit 12, an on-line status signal from the connection server 26, which may include the IP address of the callee or a "Callee Off-Line" message; performing the primary point-to-point Internet protocol in step 60, which may include receiving, at the first processing unit 12, the IP address of the callee if the callee is active and on-line; and initiating and performing the secondary point-to-point Internet protocol in step 62 if the called party is not active and/or on-line.

Figure 8:
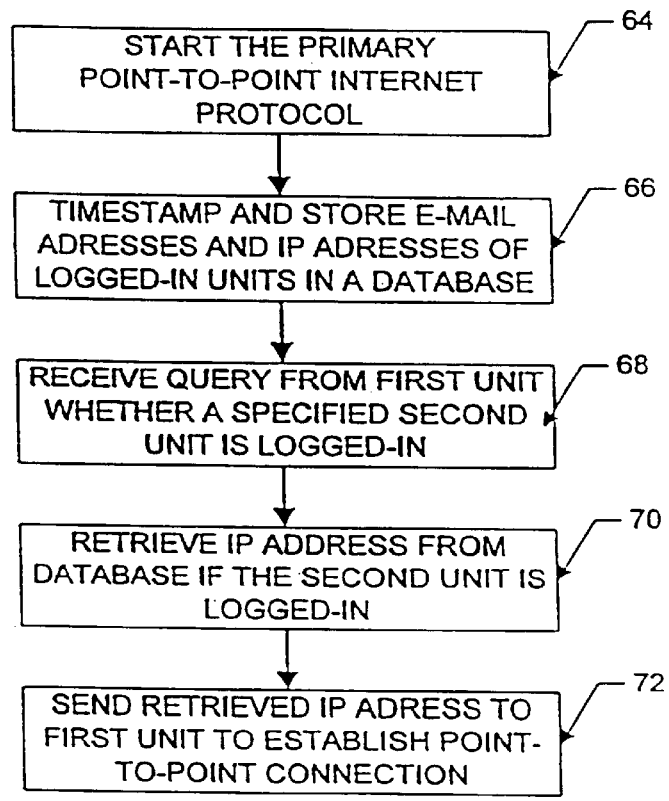
FIG. 8 illustrates a flowchart of the performance of the primary point-to-point Internet protocols.

Referring to FIG. 8 in conjunction with FIGS. 1 and 3–4, the disclosed point-to-point Internet protocol and system 10 operates using the connection server 26 to perform step 60 in FIG. 7 by starting the point-to-point Internet protocol in step 64; timestamping and storing E-mail and IP addresses of logged-in users and processing units in the database 34 in step 66; receiving a query at the connection server 26 from a first processing unit 12 in step 68 to determine whether a second user or second processing unit 22 is logged-in to the Internet 24, with the second user being specified, for example, by an E-mail address; retrieving the IP address of the specified user from the database 34 in step 70 if the specified user is logged-in to the Internet; and sending the retrieved IP address to the first processing unit in step 72 to establish point-to-point Internet communications with the specified user.

Figure 9:
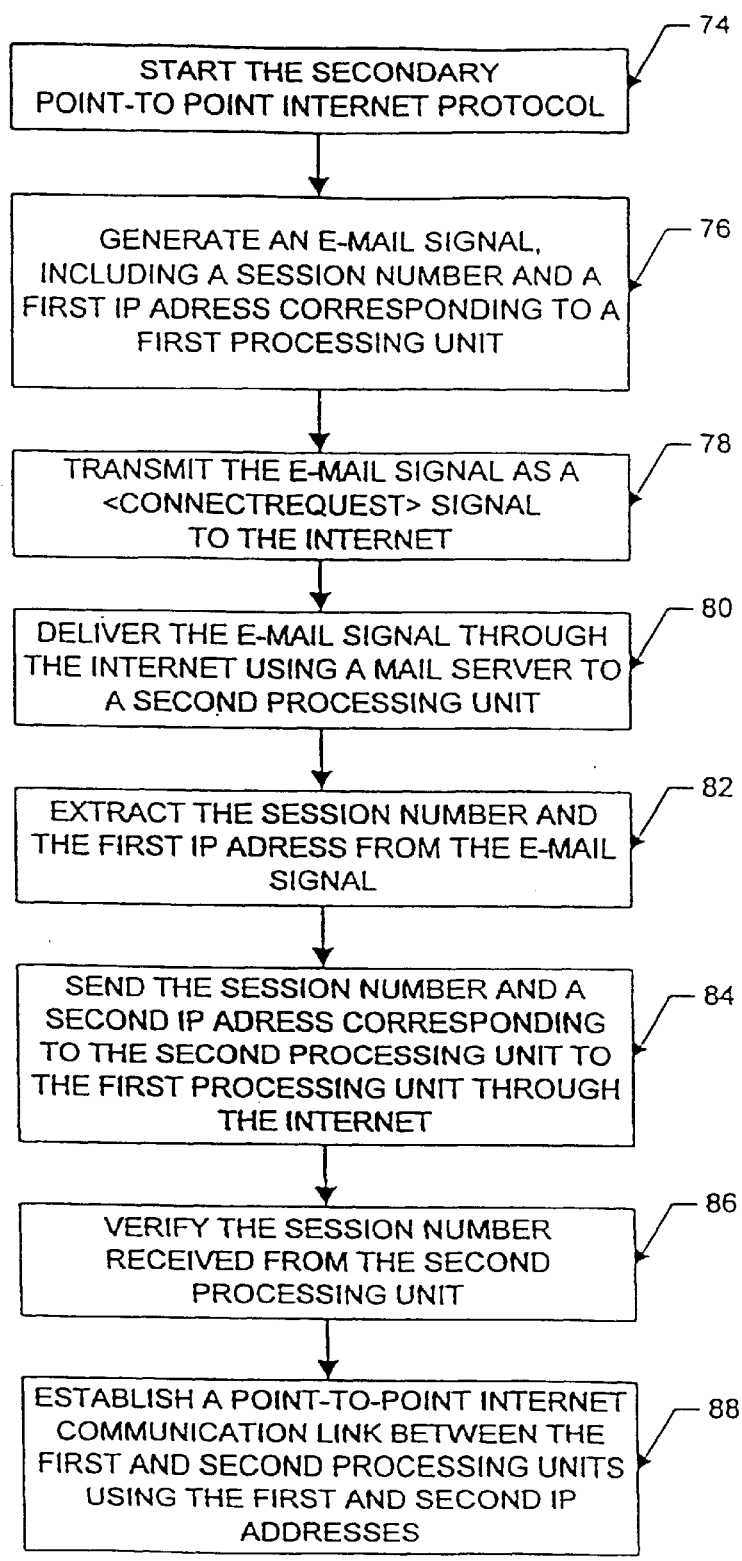
FIG. 9 illustrates a flowchart of the performance of the secondary point-to-point Internet protocol.

Referring to FIG. 9 in conjunction with FIGS. 2–4, the disclosed secondary point-to-point Internet protocol and system 10 operates at the first processing unit 12 to perform step 62 of FIG. 7. The disclosed secondary point-to-point Internet protocol operates as shown in FIG. 9 by starting the secondary point-to-point Internet protocol in step 74; generating an E-mail signal, including a session number and a first IP address corresponding to a first processing unit in step 76 using the first processing unit 12; transmitting the E-mail signal as a <ConnectRequest> signal to the Internet 24 in step 78; delivering the E-mail signal through the Internet 24 using a mail server 28 to a second processing unit 22 in step 80; extracting the session number and the first IP address from the E-mail signal in step 82; transmitting or sending the session number and a second IP address corresponding to the second processing unit 22 to the first processing unit 12 through the Internet 24 in step 84; verifying the session number received from the second processing unit 22 in step 86; and establishing a point-to-point Internet communication link between the first processing unit 12 and second processing unit 22 using the first and second IP addresses in step 88.

While the disclosed point-to-point Internet protocols and system have been particularly shown and described with reference to the preferred embodiments, it is understood by those skilled in the art that various modifications in form and detail may be made therein without departing from the scope and, spirit of the invention. Accordingly, modifications such as those suggested above, but not limited thereto, are to be considered within the scope of the invention.

What is claimed is:

1. A method for establishing point-to-point Internet communication comprising the steps of:
   (a) storing in a database a respective Internet Protocol (IP) address of a set of processing units that have an on-line status with respect to the Internet;
   (b) transmitting a query from a first processing unit to a connection server to determine the on-line status of a second processing unit; and
   (c) retrieving the IP address of the second unit from the database using the connection server, in response to the determination of a positive on-line status of the second processing unit, for establishing a point-to-point communication link between the first and second processing units through the Internet.

2. The method of claim 1 wherein the step (b) of transmitting the query includes the step of:
   (b1) transmitting the query to the connection server operatively connected to the database and the Internet; and
   wherein the step (c) of retrieving the IP address includes the steps of:
   (c1) searching the database using the connection server;
   (c2) determining the on-line status of the second processing unit;
   (c3) retrieving the IP address of the second processing unit in response to the positive on-line status of the second processing unit; and
   (c4) transmitting the IP address of the second processing unit to the first processing unit for establishing the point-to-point communication link between the first and second processing units through the Internet.

3. The method of claim 2 further comprising, after step (c2), the steps of:
   (c5) generating an off-line message in response to a negative on-line status of the second processing unit; and
   (c4) transmitting the off-line message to the first processing unit.

4. The method of claim 1 further comprising the step of:
   (d) performing a secondary communication protocol in response to a non-responsive condition of the connection server.

5. The method of claim 4 wherein the step (d) of performing the secondary communication protocol includes the steps of:
   (d1) transmitting an E-mail signal, including a first IP address, from the first processing unit;
   (d2) processing the E-mail signal through the Internet to deliver the E-mail signal to the second processing unit; and
   (d3) transmitting a second IP address to the first processing unit for establishing a point-to-point communication link between the first and second processing units through the Internet.

6. A system for point-to-point communications over the Internet comprising:
   a database for storing a set of Internet Protocol (IP) addresses of at least one processing unit that has on-line status with respect to the Internet;

a first processing unit including:
  a first program for performing a first point-to-point Internet protocol; and
  a first processor for executing the first program and for transmitting a query;
a connection server, responsive to the query, for determining the on-line status of a second processing unit by searching the database, and for transmitting an online message to the first processing unit for establishing a point-to-point communication link between the first and second processing units through the Internet.

7. The system of claim 6 wherein the connection server, responsive to a positive determination of the online status of the second processing unit, retrieves the respective IP address of the second processing unit from the database and transmits the on-line message, including the IP address, to the first processing unit; and
  wherein the first processing unit establishes the point-to-point communication link between the first and second processing units through the Internet in response to receiving the IP address of the second processing unit from the connection server.

8. The system of claim 6 wherein the connection server, responsive to a negative determination of the on-line status of the second processing unit, generates an off-line message, and transmits the off-line message to the first processing unit.

9. The system claim 6 wherein the connection server further includes a timer for timestamping IP addresses of the set of processing units having a positive on-line status with respect to the Internet.

10. The system of claim 6 further comprising:
  a mail server for processing a E-mail signal through the Internet to deliver the E-mail to a specified second processing unit for establishing a point-to-point communication link between the first and second processing units through the Internet; and
  wherein the first processor of the first processing unit executes a second program to generate and transmit the E-mail signal, including a first IP address associated with the first processing unit, to the mail server.

11. A method for establishing point-to-point Internet communication comprising the steps of:
  (a) transmitting an E-mail signal, including a first Internet Protocol (IP) address, from a first processing unit;
  (b) processing the E-mail signal through the Internet to deliver the E-mail signal to a second processing unit; and
  (c) transmitting a second IP address to the first processing unit for establishing a point-to-point communication link between the first and second processing units through the Internet.

12. The method of claim 11 further comprising the step of:
  (a1) generating the E-mail signal from the first IP address corresponding to the first processing unit before the step (a) of transmitting the E-mail signal.

13. The method of claim 11 further comprising the step of:
  (a1) generating the E-mail signal from a session number before the step (a) of transmitting the E-mail signal.

14. The method of claim 11 wherein the step (b) of processing the E-mail signal further comprises the step of:
  (b1) processing the E-mail signal using a mail server operatively connected to the second processing unit.

15. The method of claim 11 further comprising the step of:
  (b1) generating a connection signal including the second IP address at the second processing unit before the step (c) of transmitting the second IP address to the first processing unit; and
  wherein the step (c) of transmitting the second IP address includes the step (c1) of transmitting the connection signal from the second processing unit to the first processing unit.

\* \* \* \* \*

US006513066C1

(12) EX PARTE REEXAMINATION CERTIFICATE (7884th)
United States Patent
Hutton et al.

(10) Number: US 6,513,066 C1
(45) Certificate Issued: Nov. 23, 2010

(54) ESTABLISHING A POINT-TO-POINT INTERNET COMMUNICATION

(75) Inventors: Glenn W. Hutton, Miami, FL (US); Shane D. Mattaway, Boca Raton, FL (US); Craig B. Strickland, Tamarac, FL (US)

(73) Assignee: Net2Phone, Inc., Newark, NJ (US)

Reexamination Request:
No. 90/010,423, Feb. 24, 2009

Reexamination Certificate for:
Patent No.: 6,513,066
Issued: Jan. 28, 2003
Appl. No.: 09/407,270
Filed: Sep. 29, 1999

Related U.S. Application Data

(63) Continuation of application No. 08/533,115, filed on Sep. 25, 1995, now Pat. No. 6,108,704.

(51) Int. Cl.
H04M 1/725 (2006.01)
H04M 1/57 (2006.01)
H04M 1/72 (2006.01)
H04L 12/58 (2006.01)

(52) U.S. Cl. .................. 709/227; 709/238; 709/245
(58) Field of Classification Search ................ None
See application file for complete search history.

(56) References Cited

U.S. PATENT DOCUMENTS

| | | | |
|---|---|---|---|
| 4,313,035 A | 1/1982 | Jordan et al. | |
| 4,332,982 A | 6/1982 | Thomas | |
| 4,410,765 A | 10/1983 | Hestad et al. | |
| 4,423,414 A | 12/1983 | Bryant et al. | |
| 4,446,519 A | 5/1984 | Thomas | |
| 4,450,554 A | 5/1984 | Steensma et al. | |
| 4,468,529 A | 8/1984 | Samuel et al. | |
| 4,491,693 A | 1/1985 | Sano et al. | |
| 4,528,659 A | 7/1985 | Jones, Jr. | |
| 4,589,107 A | 5/1986 | Middleton et al. | |

(Continued)

FOREIGN PATENT DOCUMENTS

| AU | 200059377 A1 | 11/2000 |
|---|---|---|
| AU | 200059378 A1 | 11/2000 |
| AU | 200059379 A1 | 11/2000 |
| EP | 0455402 A2 | 11/1991 |
| EP | 0497022 A1 | 5/1992 |

(Continued)

OTHER PUBLICATIONS

The Open Group, Technical Standard, *Protocols for X/Open PC Interworking: SMB, Version 2*, 1992, pages ii–xvi and pp. 1–516.

(Continued)

*Primary Examiner*—Alexander J Kosowski

(57) ABSTRACT

A point-to-point Internet protocol exchanges Internet Protocol (IP) addresses between processing units to establish a point-to-point communication link between the processing units through the Internet. A first point-to-point Internet protocol includes the steps of (a) storing in a database a respective IP address of a set of processing units that have an on-line status with respect to the Internet; (b) transmitting a query from a first processing unit to a connection server to determine the on-line status of a second processing unit; and (c) retrieving the IP address of the second unit from the database using the connection server, in response to the determination of a positive on-line status of the second processing unit, for establishing a point-to-point communication link between the first and second processing units through the Internet. A second point-to-point Internet protocol includes the steps of (a) transmitting an E-mail signal, including a first IP address, from a first processing unit; (b) processing the E-mail signal through the Internet to deliver the E-mail signal to a second processing unit; and (c) transmitting a second IP address to the first processing unit for establishing a point-to-point communication link between the first and second processing units through the Internet.

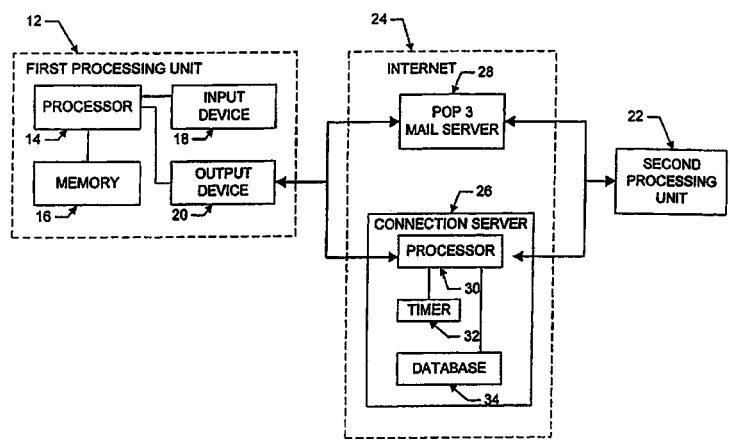

U.S. PATENT DOCUMENTS

| | | |
|---|---|---|
| 4,594,477 A | 6/1986 | Noirot |
| 4,598,397 A | 7/1986 | Nelson et al. |
| 4,602,132 A | 7/1986 | Nagatomi et al. |
| 4,630,262 A | 12/1986 | Callens et al. |
| 4,652,703 A | 3/1987 | Lu et al. |
| 4,653,090 A | 3/1987 | Hayden |
| 4,654,483 A | 3/1987 | Imai et al. |
| 4,658,093 A | 4/1987 | Hellman |
| 4,694,492 A | 9/1987 | Wirstrom et al. |
| 4,706,274 A | 11/1987 | Baker et al. |
| 4,740,963 A | 4/1988 | Eckley |
| 4,754,479 A | 6/1988 | Bicknell et al. |
| 4,755,985 A | 7/1988 | Jayapalan et al. |
| 4,756,020 A | 7/1988 | Fodale |
| 4,759,056 A | 7/1988 | Akiyama |
| 4,782,485 A | 11/1988 | Gollub |
| 4,799,153 A | 1/1989 | Hann et al. |
| 4,800,488 A | 1/1989 | Agrawal et al. |
| 4,809,271 A | 2/1989 | Kondo et al. |
| 4,813,040 A | 3/1989 | Futato |
| 4,819,228 A | 4/1989 | Baran et al. |
| 4,821,263 A | 4/1989 | Lundh |
| 4,823,374 A | 4/1989 | Verlohr |
| 4,827,411 A | 5/1989 | Arrowood |
| 4,829,554 A | 5/1989 | Barnes et al. |
| 4,837,797 A | 6/1989 | Freeny, Jr. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,899,333 A | 2/1990 | Roediger |
| 4,899,373 A | 2/1990 | Lee et al. |
| 4,912,705 A | 3/1990 | Paneth et al. |
| 4,914,571 A | 4/1990 | Baratz et al. |
| 4,928,306 A | 5/1990 | Biswas et al. |
| 4,932,022 A | 6/1990 | Keeney et al. |
| 4,953,159 A | 8/1990 | Hayden |
| 4,962,449 A | 10/1990 | Schlesinger |
| 4,981,371 A | 1/1991 | Gurak et al. |
| 4,989,230 A | 1/1991 | Gillig et al. |
| 4,995,074 A | 2/1991 | Goldman et al. |
| 5,031,089 A | 7/1991 | Liu et al. |
| 5,036,513 A | 7/1991 | Greenblatt |
| 5,040,141 A | 8/1991 | Yazima et al. |
| 5,056,140 A | 10/1991 | Kimbell |
| 5,065,425 A | 11/1991 | Lecomte et al. |
| 5,107,443 A | 4/1992 | Smith et al. |
| 5,109,403 A | 4/1992 | Sutphin |
| 5,113,499 A | 5/1992 | Ankney et al. |
| 5,121,385 A | 6/1992 | Tominaga et al. |
| 5,127,001 A | 6/1992 | Steagall et al. |
| 5,127,003 A | 6/1992 | Dell, Jr. et al. |
| 5,130,985 A | 7/1992 | Kondo et al. |
| 5,134,648 A | 7/1992 | Hochfield et al. |
| 5,136,716 A | 8/1992 | Harvey et al. |
| 5,150,410 A | 9/1992 | Bertrand |
| 5,153,908 A | 10/1992 | Kakizawa et al. |
| 5,155,726 A | 10/1992 | Spinney et al. |
| 5,157,592 A | 10/1992 | Walters |
| 5,159,592 A | 10/1992 | Perkins |
| 5,164,988 A | 11/1992 | Matyas et al. |
| 5,185,860 A | 2/1993 | Wu |
| 5,187,591 A | 2/1993 | Guy et al. |
| 5,195,086 A | 3/1993 | Baumgartner et al. |
| 5,212,789 A | 5/1993 | Rago |
| 5,214,650 A | 5/1993 | Renner et al. |
| 5,220,599 A | 6/1993 | Sasano et al. |
| 5,241,594 A | 8/1993 | Kung |
| 5,241,625 A | 8/1993 | Epard et al. |
| 5,247,620 A | 9/1993 | Fukuzawa et al. |
| 5,249,290 A | 9/1993 | Heizer |
| 5,274,635 A | 12/1993 | Rahman et al. |
| 5,282,197 A | 1/1994 | Kreitzer |
| 5,283,819 A | 2/1994 | Glick et al. |
| 5,287,103 A | 2/1994 | Kasprzyk et al. |
| 5,410,754 A | 2/1994 | Favreau et al. |
| 5,301,324 A | 4/1994 | Dewey et al. |
| 5,305,312 A | 4/1994 | Fornek et al. |
| 5,315,705 A | 5/1994 | Iwami et al. |
| 5,319,705 A | 6/1994 | Halter et al. |
| 5,325,524 A | 6/1994 | Black et al. |
| 5,327,486 A | 7/1994 | Wolff et al. |
| 5,329,619 A | 7/1994 | Page et al. |
| 5,335,276 A | 8/1994 | Thompson et al. |
| 5,341,374 A | 8/1994 | Lewen et al. |
| 5,347,632 A | 9/1994 | Filepp et al. |
| 5,377,260 A | 12/1994 | Long |
| 5,388,213 A | 2/1995 | Oppenheimer et al. |
| 5,396,485 A | 3/1995 | Ohno et al. |
| 5,402,477 A | 3/1995 | McMahan et al. |
| 5,402,528 A | 3/1995 | Christopher et al. |
| 5,408,526 A | 4/1995 | McFarland et al. |
| 5,408,619 A | 4/1995 | Oran |
| 5,425,028 A | 6/1995 | Britton et al. |
| 5,428,608 A | 6/1995 | Freeman et al. |
| 5,432,846 A | 7/1995 | Norio |
| 5,434,913 A | 7/1995 | Tung et al. |
| 5,440,547 A | 8/1995 | Easki et al. |
| 5,440,632 A | 8/1995 | Bacon et al. |
| 5,446,891 A | 8/1995 | Kaplan et al. |
| 5,446,919 A | 8/1995 | Wilkins |
| 5,452,289 A | 9/1995 | Sharma et al. |
| 5,457,738 A | 10/1995 | Sylvan |
| 5,459,864 A | 10/1995 | Brent et al. |
| 5,461,611 A | 10/1995 | Drake, Jr. et al. |
| 5,461,668 A | 10/1995 | Zdenek et al. |
| 5,473,531 A | 10/1995 | Flora-Holmquist et al. |
| 5,465,286 A | 11/1995 | Clare et al. |
| 5,467,388 A | 11/1995 | Redd et al. |
| 5,469,500 A | 11/1995 | Satter et al. |
| 5,474,741 A | 12/1995 | Mikeska et al. |
| 5,474,819 A | 12/1995 | Chambers et al. |
| 5,475,741 A | 12/1995 | Davis et al. |
| 5,475,819 A | 12/1995 | Miller et al. |
| 5,481,720 A | 1/1996 | Loucks et al. |
| 5,483,524 A | 1/1996 | Lev et al. |
| 5,487,100 A | 1/1996 | Kane |
| 5,491,800 A | 2/1996 | Goldsmith et al. |
| 5,591,800 A | 2/1996 | Goldsmith et al. |
| 5,499,295 A | 3/1996 | Cooper |
| 5,500,890 A | 3/1996 | Rogge et al. |
| 5,502,727 A | 3/1996 | Catanzaro et al. |
| 5,509,058 A | 4/1996 | Sestak et al. |
| 5,515,508 A | 5/1996 | Pettus et al. |
| 5,517,432 A | 5/1996 | Chandra et al. |
| 5,524,141 A | 6/1996 | Braun et al. |
| 5,528,671 A | 6/1996 | Ryu et al. |
| 5,533,102 A | 7/1996 | Robinson et al. |
| 5,533,110 A | 7/1996 | Pinard et al. |
| 5,544,164 A | 8/1996 | Baran |
| 5,544,322 A | 8/1996 | Cheng et al. |
| 5,546,448 A | 8/1996 | Caswell et al. |
| 5,546,452 A | 8/1996 | Andrews et al. |
| 5,548,636 A | 8/1996 | Bannister et al. |
| 5,548,694 A | 8/1996 | Frisken Gibson |
| 5,555,290 A | 9/1996 | McLeod et al. |
| 5,563,882 A | 10/1996 | Bruno et al. |
| 5,572,643 A | 11/1996 | Judson |
| 5,574,774 A | 11/1996 | Ahlberg et al. |
| 5,574,934 A | 11/1996 | Mirashrafi et al. |

| | | | | | |
|---|---|---|---|---|---|
| 5,581,522 A | 12/1996 | Shibuya et al. | 5,768,527 A | 6/1998 | Zhu et al. |
| 5,581,702 A | 12/1996 | McArdle et al. | 5,771,355 A | 6/1998 | Kuzma |
| 5,586,257 A | 12/1996 | Perlman | 5,774,656 A | 6/1998 | Hattori et al. |
| 5,586,260 A | 12/1996 | Hu | 5,774,660 A | 6/1998 | Brendel et al. |
| 5,604,737 A | 2/1997 | Iwami et al. | 5,774,666 A | 6/1998 | Portuesi |
| 5,606,669 A | 2/1997 | Bertin et al. | 5,778,181 A | 7/1998 | Hidary et al. |
| 5,608,786 A | 3/1997 | Gordon | 5,778,187 A | 7/1998 | Monteiro et al. |
| 5,614,940 A | 3/1997 | Cobbley et al. | 5,784,564 A | 7/1998 | Camaisa et al. |
| 5,615,257 A | 3/1997 | Pezzullo et al. | 5,784,619 A | 7/1998 | Evans et al. |
| 5,619,557 A | 4/1997 | Van Berkum | 5,787,253 A | 7/1998 | McCreery et al. |
| 5,621,789 A | 4/1997 | McCalmont et al. | 5,790,548 A | 8/1998 | Sistanizadeh et al. |
| 5,623,483 A | 4/1997 | Agrawal et al. | 5,790,792 A | 8/1998 | Dudgeon et al. |
| 5,623,490 A | 4/1997 | Richter et al. | 5,790,793 A | 8/1998 | Higley |
| 5,623,605 A | 4/1997 | Keshav et al. | 5,790,803 A | 8/1998 | Kinoshita et al. |
| 5,625,407 A | 4/1997 | Biggs et al. | 5,793,365 A | 8/1998 | Tang et al. |
| 5,627,978 A | 5/1997 | Altom et al. | 5,794,018 A | 8/1998 | Vrvilo et al. |
| 5,636,282 A | 6/1997 | Holmquist et al. | 5,794,257 A | 8/1998 | Liu et al. |
| 5,636,346 A | 6/1997 | Saxe | 5,796,394 A | 8/1998 | Wicks et al. |
| 5,642,156 A | 6/1997 | Saiki | 5,799,063 A | 8/1998 | Krane |
| 5,644,629 A | 7/1997 | Chow | 5,799,072 A | 8/1998 | Vulcan et al. |
| 5,649,194 A | 7/1997 | Miller et al. | 5,799,150 A | 8/1998 | Hamilton et al. |
| 5,652,759 A | 7/1997 | Stringfellow, Jr. | 5,812,819 A | 8/1998 | Rodwin et al. |
| 5,655,120 A | 8/1997 | Witte et al. | 5,805,587 A | 9/1998 | Norris et al. |
| 5,659,542 A | 8/1997 | Bell et al. | 5,805,810 A | 9/1998 | Maxwell |
| 5,659,596 A | 8/1997 | Dunn | 5,805,822 A | 9/1998 | Long et al. |
| 5,668,862 A | 9/1997 | Bannister et al. | 5,809,233 A | 9/1998 | Shur |
| 5,671,412 A | 9/1997 | Christiano | 5,815,665 A | 9/1998 | Teper et al. |
| 5,671,428 A | 9/1997 | Muranaga et al. | 5,816,919 A | 10/1998 | Scagnelli et al. |
| 5,675,507 A | 10/1997 | Bobo | 5,818,510 A | 10/1998 | Cobbley et al. |
| 5,680,392 A | 10/1997 | Semaan | 5,818,836 A | 10/1998 | DuVal |
| 5,684,800 A | 11/1997 | Dobbins et al. | 5,819,084 A | 10/1998 | Shapiro |
| 5,684,951 A | 11/1997 | Goldman et al. | 5,822,524 A | 10/1998 | Chen et al. |
| 5,689,553 A | 11/1997 | Ahuja et al. | 5,825,865 A | 10/1998 | Oberlander et al. |
| 5,689,641 A | 11/1997 | Ludwig et al. | 5,828,837 A | 10/1998 | Eikeland |
| 5,692,180 A | 11/1997 | Lee | 5,828,843 A | 10/1998 | Grimm et al. |
| 5,692,192 A | 11/1997 | Sudo | 5,828,846 A | 10/1998 | Kirby et al. |
| 5,694,594 A | 12/1997 | Chang | 5,832,119 A | 11/1998 | Rhoads |
| 5,701,463 A | 12/1997 | Malcolm | 5,832,240 A | 11/1998 | Larsen et al. |
| 5,708,422 A | 1/1998 | Blonder et al. | 5,835,720 A | 11/1998 | Nelson et al. |
| 5,708,655 A | 1/1998 | Toth et al. | 5,835,723 A | 11/1998 | Andrews et al. |
| 5,710,884 A | 1/1998 | Dedrick | 5,835,725 A | 11/1998 | Chiang et al. |
| 5,717,923 A | 2/1998 | Dedrick | 5,838,683 A | 11/1998 | Corley et al. |
| 5,719,786 A | 2/1998 | Nelson et al. | 5,838,970 A | 11/1998 | Thomas |
| 5,721,827 A | 2/1998 | Logan et al. | 5,841,769 A | 11/1998 | Okanoue et al. |
| 5,724,092 A | 3/1998 | Davidsohn et al. | 5,842,216 A | 11/1998 | Anderson et al. |
| 5,724,412 A | 3/1998 | Srinivasan | 5,844,978 A | 12/1998 | Reuss et al. |
| 5,724,506 A | 3/1998 | Cleron et al. | 5,848,143 A | 12/1998 | Andrews et al. |
| 5,724,648 A | 3/1998 | Shaughnessy et al. | 5,848,396 A | 12/1998 | Gerace |
| 5,726,984 A | 3/1998 | Kubler et al. | 5,854,901 A | 12/1998 | Cole et al. |
| 5,729,748 A | 3/1998 | Robbins et al. | 5,857,072 A | 1/1999 | Crowle |
| 5,732,078 A | 3/1998 | Arango | 5,864,684 A | 1/1999 | Nielsen |
| 5,734,828 A | 3/1998 | Pendse et al. | 5,867,156 A | 2/1999 | Beard et al. |
| 5,758,257 A | 3/1998 | Herz et al. | 5,867,654 A | 2/1999 | Ludwig et al. |
| 5,736,968 A | 4/1998 | Tsakiris | 5,867,665 A | 2/1999 | Butman et al. |
| 5,742,668 A | 4/1998 | Pepe et al. | 5,872,850 A | 2/1999 | Klein et al. |
| 5,742,675 A | 4/1998 | Kilander et al. | 5,872,922 A | 2/1999 | Hogan et al. |
| 5,742,762 A | 4/1998 | Scholl et al. | 5,872,972 A | 2/1999 | Boland et al. |
| 5,742,905 A | 4/1998 | Pepe et al. | 5,883,956 A | 3/1999 | Le et al. |
| 5,745,642 A | 4/1998 | Ahn | 5,884,032 A | 3/1999 | Bateman et al. |
| 5,745,702 A | 4/1998 | Morozumi | 5,884,035 A | 3/1999 | Butman et al. |
| 5,745,711 A | 4/1998 | Kitahara et al. | 5,884,077 A | 3/1999 | Suzuki |
| 5,751,712 A | 5/1998 | Farwell et al. | 5,890,162 A | 3/1999 | Huckins |
| 5,751,961 A | 5/1998 | Smyk | 5,892,825 A | 4/1999 | Mages et al. |
| 5,754,636 A | 5/1998 | Bayless et al. | 5,892,903 A | 4/1999 | Klaus |
| 5,754,939 A | 5/1998 | Herz et al. | 5,892,924 A | 4/1999 | Lyon et al. |
| 5,758,110 A | 5/1998 | Boss et al. | 5,903,721 A | 5/1999 | Sixtus |
| 5,761,606 A | 6/1998 | Wolzien | 5,903,723 A | 5/1999 | Beck et al. |
| 5,764,736 A | 6/1998 | Shachar et al. | 5,903,727 A | 5/1999 | Nielsen |
| 5,764,741 A | 6/1998 | Barak | 5,905,719 A | 5/1999 | Arnold et al. |
| 5,764,756 A | 6/1998 | Onweller | 5,905,736 A | 5/1999 | Ronen et al. |
| 5,767,897 A | 6/1998 | Howell | 5,905,865 A | 5/1999 | Palmer et al. |

| | | |
|---|---|---|
| 5,905,872 A | 5/1999 | DeSimone et al. |
| 5,915,001 A | 6/1999 | Uppaluru |
| 5,923,736 A | 7/1999 | Shachar |
| 5,924,093 A | 7/1999 | Potter et al. |
| 5,925,103 A | 7/1999 | Magallanes et al. |
| 5,928,327 A | 7/1999 | Wang et al. |
| 5,929,849 A | 7/1999 | Kikinis |
| 5,937,162 A | 8/1999 | Funk et al. |
| 5,946,386 A | 8/1999 | Rogers et al. |
| 5,946,629 A | 8/1999 | Sawyer et al. |
| 5,950,123 A | 9/1999 | Schwelb et al. |
| 5,950,172 A | 9/1999 | Klingman |
| 5,953,350 A | 9/1999 | Higgins |
| 5,956,482 A | 9/1999 | Agraharam et al. |
| 5,956,485 A | 9/1999 | Perlman |
| 5,961,584 A | 10/1999 | Wolf |
| 5,964,872 A | 10/1999 | Turpin |
| 5,969,967 A | 10/1999 | Aahlad et al. |
| 5,982,774 A | 11/1999 | Foladare et al. |
| 5,983,005 A | 11/1999 | Monteiro et al. |
| 5,999,965 A | 12/1999 | Kelly |
| 6,005,870 A | 12/1999 | Leung |
| 6,006,257 A | 12/1999 | Slezak |
| 6,009,469 A | 12/1999 | Mattaway et al. |
| 6,014,379 A | 1/2000 | White et al. |
| 6,014,710 A | 1/2000 | Talluri et al. |
| 6,016,393 A | 1/2000 | White et al. |
| 6,018,768 A | 1/2000 | Ullman et al. |
| 6,018,771 A | 1/2000 | Hayden |
| 6,021,126 A | 2/2000 | White et al. |
| 6,026,086 A | 2/2000 | Lancelot et al. |
| 6,026,425 A | 2/2000 | Suguri et al. |
| 6,029,175 A | 2/2000 | Chow et al. |
| 6,031,836 A | 2/2000 | Haserodt |
| 6,032,192 A | 2/2000 | Wegner et al. |
| 6,041,345 A | 3/2000 | Levi et al. |
| 6,047,054 A | 4/2000 | Bayless et al. |
| 6,047,292 A | 4/2000 | Kelly et al. |
| 6,055,594 A | 4/2000 | Lo et al. |
| 6,061,716 A | 5/2000 | Moncreiff |
| 6,064,975 A | 5/2000 | Moon et al. |
| 6,065,048 A | 5/2000 | Highley |
| 6,067,350 A | 5/2000 | Gordon |
| 6,069,890 A | 5/2000 | White et al. |
| 6,085,217 A | 7/2000 | Ault et al. |
| 6,101,182 A | 8/2000 | Sistanizadeh et al. |
| 6,105,053 A | 8/2000 | Kimmel et al. |
| 6,108,704 A | 8/2000 | Hutton et al. |
| 6,122,255 A | 9/2000 | Bartholomew et al. |
| 6,125,113 A | 9/2000 | Farris et al. |
| 6,131,121 A | 10/2000 | Mattaway et al. |
| 6,137,877 A | 10/2000 | Robin et al. |
| 6,141,341 A | 10/2000 | Jones et al. |
| 6,151,643 A | 11/2000 | Cheng et al. |
| 6,154,445 A | 11/2000 | Farris et al. |
| 6,163,316 A | 12/2000 | Killian |
| 6,173,044 B1 | 1/2001 | Hortensius et al. |
| 6,178,453 B1 | 1/2001 | Mattaway et al. |
| 6,181,689 B1 | 1/2001 | Choung et al. |
| 6,185,184 B1 | 2/2001 | Mattaway et al. |
| 6,195,357 B1 | 2/2001 | Polcyn |
| 6,198,303 B1 | 3/2001 | Rangasayee |
| 6,205,135 B1 | 3/2001 | Chinni et al. |
| 6,212,625 B1 | 4/2001 | Russell |
| 6,226,678 B1 | 5/2001 | Mattaway et al. |
| 6,226,690 B1 | 5/2001 | Banda et al. |
| 6,240,444 B1 | 5/2001 | Fin et al. |
| 6,243,373 B1 | 6/2001 | Turock |
| 6,266,539 B1 | 7/2001 | Pardo |
| 6,275,490 B1 | 8/2001 | Mattaway et al. |
| 6,282,272 B1 | 8/2001 | Noonen et al. |
| 6,289,369 B1 | 9/2001 | Sundaresan |
| 6,300,863 B1 | 10/2001 | Cotichini et al. |
| 6,338,078 B1 | 1/2002 | Chang et al. |
| 6,343,115 B1 | 1/2002 | Foladare et al. |
| 6,343,220 B1 | 1/2002 | van der Salm |
| 6,347,085 B2 | 2/2002 | Kelly |
| 6,347,342 B1 | 2/2002 | Marcos et al. |
| 6,360,266 B1 | 3/2002 | Pettus |
| 6,377,568 B1 | 4/2002 | Kelly |
| 6,385,583 B1 | 5/2002 | Ladd et al. |
| 6,393,455 B1 | 5/2002 | Eilert et al. |
| 6,427,064 B1 | 7/2002 | Henderson |
| 6,434,552 B1 | 8/2002 | Leong |
| 6,463,565 B1 | 10/2002 | Kelly |
| 6,477,586 B1 | 11/2002 | Achenson et al. |
| 6,513,066 B1 | 1/2003 | Hutton et al. |
| 6,594,254 B1 | 7/2003 | Kelly |
| 6,687,738 B1 | 2/2004 | Hutton |
| 6,701,365 B1 | 3/2004 | Hutton |
| 6,704,802 B1 | 3/2004 | Finch et al. |
| 6,728,784 B1 | 4/2004 | Mattaway |
| 6,772,335 B2 | 8/2004 | Curtis et al. |
| 6,829,645 B1 | 12/2004 | Hutton |
| 6,888,836 B1 | 5/2005 | Cherkasova |
| 6,909,708 B1 | 6/2005 | Krishnaswamy et al. |
| 2003/0050075 A1 | 3/2003 | Rangarajan et al. |
| 2004/0204146 A1 | 10/2004 | Deeds |
| 2005/0032435 A1 | 2/2005 | Tischer et al. |
| 2005/0130611 A1 | 6/2005 | Lu et al. |

FOREIGN PATENT DOCUMENTS

| | | |
|---|---|---|
| EP | 0518596 | 12/1992 |
| EP | 0556012 A2 | 8/1993 |
| EP | 0559047 | 9/1993 |
| EP | 0581722 | 2/1994 |
| EP | 0597691 | 5/1994 |
| EP | 0632672 | 1/1995 |
| EP | 0648038 | 4/1995 |
| EP | 1379039 A2 | 1/2004 |
| EP | 1379050 A2 | 1/2004 |
| GB | 2283645 | 5/1995 |
| JP | 5944140 | 3/1984 |
| JP | 63-131637 | 3/1988 |
| JP | 6-62020 | 3/1994 |
| WO | WO-9003074 | 3/1990 |
| WO | WO-9219054 | 10/1992 |
| WO | WO-9422087 | 9/1994 |
| WO | WO-9714234 | 4/1997 |
| WO | WO-9811704 | 3/1998 |

OTHER PUBLICATIONS

Zellweger, Polle T., et al., *Etherphone: Collected Papers 1987–1988*, Xerox Corporation, May 1989.

Vin, Herrick M., et al, *Multimedia Conferencing in the Etherphone Environment*, Oct. 1991, pp. 69–79.

*VocalChat User's Guide Version 2.0*, Vocaltec, 1994, pp. 1–77.

*README, VocalChat Version 2.02 & VocalChat WAN Version 2.02*, Vocaltec, Jun. 1994, pp. 1–3.

*VocalChat 1.01 Network Information*, Vocaltec, 1994, pp. 1–10.

*VocalChat Information*, Vocaltec, 1994, pp. 1–31.

*VocalChat Troubleshooting*, Vocaltec, 1994, pp. 1–101.

"Circuit Switching", Ericsson, last published Jul. 5, 2001, found at http://www.ericsson.com/multiservicenetworks/circuitswitching/axe/ printed on Aug. 1, 2001, 2 pages.

"Data Communication Over the Telephone Network", International Telecommunication Union, CCITT The International Telegraph and Telephone Consultative Committee, Blue Book, vol. VIII—Fascicle VIII.1, IXth Plenary Assembly, Melbourne, Nov. 14–25, 1988, pp. 296–370.

"Full Duplex Speakerphone", IBM Technical Disclosure Bulletin, vol. 29, No. 12, May 1987, pp. 5599–5602.

"ICL OPD—One Per Desk", Issue Aug. 1, 1990, A Comprehensive Technical Information Document (24 pages).

"Information Processing Techniques Program. vol. II. Wideband Integrated Voice/Data Technology" Semiannual Technical Summary Report, Massachusetts Institute of Technology Lexington, MA, Oct. 1, 1997–Mar. 31, 1978, Issued Aug. 31, 1978, pp. 1–25 and 27–31, ADA067014.

"Integrated Voice/Data PABX Communications", IBM Technical Disclosure Bulletin, Sep. 1986, http://patents.ibm.com.

"Level 1–5 of 65 Stories" 1990 Network World, Inc., Apr. 16, 1990, pp. 114–115.

"Multi–Service Networks", Ericsson, last published Jun. 27, 2001, found at http://www.ericsson.com/multiservicenetworks/circuitswitching/printed on Aug. 1, 2001, 2 pages.

"The History of TPC.INT", Jan. 15, 1999, 2 pages, found at http://www.tpc.in/faq/history.html printed on Aug. 8, 2002.

A. A. Kapauan, et al. "Wideband Packet Access for Workstations: Integrated Voice/Data/Image Services on the UNIX+ PC", IEEE Global Telecommunications Conference, Houston, Texas, Dec. 1–4, 1986, Conference Record vol. 3, pp. 1439–1441.

Ahrens, Richard L., "Frequently–Asked Questions about Internet VoiceChat 1.1 FAQ Version: 1.0", 1994, 6 pages.

Andy Hopper "Pandora—An Experimental System for Multimedia Applications", Operating Systems Review, Jan. 12, 1990, pp. 1–16.

Bennett, Geoff, "Designing TCP/IP Internetworks", Chapter 11, pp. 290,291 and 323, Van Nostrand Reinhold, 1995.

Bernard Gold "Digital Speech Networks", Proceedings of the IEEE, vol. 65, No. 12, Dec. 1977, pp. 1636–1658.

Bill Newman "An ISDN Data and Voice Terminal Based on a Personal Computer", Globecom'85, IEEE Global Telecommunications Conference, Conference Record vol. 3, New Orleans, Louisiana, Dec. 2–5, 1985, pp. 1048–1052.

Borland, John, "Technology uses one number to find you on any device", May 17, 2001, 3 pages, found at http://news.cnet.com/news/0–1004–201–5939191–0.html.

C. Malamud et al., "Principles of Operation for the TPC.INT Subdomain: General Principles and Policy", RFC 1530, Oct. 1993, pp. 1–7.

C. Malamud et al., "Principles of Operation for the TPC.INT Subdomain: Remote Printing—Administrative Policies", RFC 1529, Oct. 1993, pp. 1–5.

C. Malamud et al., "Principles of Operation for the TPC.INT Subdomain: Remote Printing—Technical Procedures", RFC 1528, Oct. 1993, pp. 1–12.

C. Topolcic "Experimental Internet Stream Protocol, Version 2 (ST–II)", Request for Comments 1190, Oct. 1990, pp. 1–148.

C. Yang, "INETPhone: Telephone Services and Servers on Internet", Request for Comments 1789, pp. 1–6, Apr. 1995.

Implementation of Next–Generation Agent–Dedicated Communications, by Agatsuma et al., Tech Report of IEICE 94–216 (Mar. 1995).

Paul Francis, "Comparison of Geographical and Provider–rooted Internet Addressing," Computer Networks and ISDN Systems 27(3)437–448, 1994 (selected paper from INET 94/JENC 5).

Paul Gilster, "Internet Navigator", Maruzen Kabushiki–Kaisha (1st Ed.), pp. 473–476, Feb. 28, 1995.

Paul Tsuchiya, Tony Eng, "Extending the IP Internet Through Address Reuse," ACM SIGCOMM Computer Communications Review, 23(1):16–33, Jan. 1993.

Tamohiro Kawai, Nikkei Communications, No. 202, pp. 29–30, Nikkei BP, Jul. 17, 1995 ("Communication software appears on the Internet").

Translation of Japanese Kokai H07–129488 (published May 19, 1995).

Carl A. Sunshine, et al. "Broad–Band Personal Computer LAN's", IEEE Journal on Selected Areas in Communications, vol. SAC–3, No. 3, May 1985, pp. 408–415.

Cindy Mueller et al., "ATD Data Services", http://www.iita.ucar.edu/ws/datawkshop/Abstract–ATD.html, Jan. 5, 1995, 2 pages.

Clifford J. Weinstein, et al. "Experience with Speech Communication in Packet Networks" IEEE Journal on Selected Areas in Communications, vol. SAC–1, No. 6, (ISSN 0733–8716), Dec. 1983, pp. 963–980.

D. Adolphs, et al. "Adapters for the Public ISDN", pp. 72–80.

D. Perkins "The Point–to–Point Protocot for the Transmission of Multi–Protocol Datagrams Over Point–to–Point Links", Request for Comments 1171, ftp://ftp.isi.edu/in-notes/rfc1171.txt, Jul. 1990, pp. 1–48.

D.C. Swinehart et al., "Adding Voice to an Office Computer Network", IEEE Global Telecommunications Conference, Nov. 28–Dec. 1, 1983, Conference Record vol. 1 of 3, pp. 392–398.

Dale Gulick et al., "Interface the ISDN to Your PC With a Voice/Data Board", Design Applications, 2328 Electronic Design, 35 (1987) Dec. 10, No. 29, Hashbrouck Heights, NJ, USA, pp. 85–88, XP 000004313.

Daniel C. Swinehart "Telephone Management in the Etherphone System", IEEE/IEICE Global Telecommunications Conference '87, Conference Record vol. 2 of 3, Nov. 15–18, 1987, pp. 1176–1180.

Danny Cohen "A Network Voice Protocol NVP–II", Apr. 1, 1981, pp. 1–68.

Danny Cohen "Packet Communication of Online Speech", AFIPS Conference Proceedings, 1981 National Computer Conference, May 4–7, 1981, Chicago, Illinois, pp. 169–176.

Danny Cohen "Specifications for the Network Voice Protocol (NVP)", Request for Comments 741, Jan. 29, 1976, pp. 1–30.

Don H. Johnson, et al. "A Local Access Network for Packetized Digital Voice Communication", IEEE Transactions on Communications, vol. Com. 29, No. 5, May 1981, pp. 679–688.

Douglas B. Terry and Daniel C. Swinehart, "Managing Stored Voice in the Etherphone System", 1987 ACM 089791–242–X/87/0011/0103, pp. 103–104.

Douglas B. Terry and Daniel C. Swinehart, "Managing Stored Voice in the Etherphone System", ACM Transactions on Computer Systems, vol. 6, No. 1, Feb. 1988, pp. 3–27.

Eve M. Schooler, et al. "A Packet–Switched Multimedia Conferencing System", SIGOIS Bulletin, pp. 12–22.

Gary C. Kessler "ISDN Concepts, Facilities, and Services", McGraw–Hill, Inc., c1990, pp. 224–231, ISBN 0–07–034242–3.

Giulio Barberis, et al. "Coded Speech in Packet–Switched Networks: Models and Experiments" IEEE Journal on Selected Areas in Communications, vol. SAC–1, No. 6, Dec. 1983, pp. 1028–1038.

H. Jonathan Chao, et al. "A Packet Video System Using the Dynamic Time Division Multiplexing Technique", IEEE Global Telecommunications Conference, Houston, Texas, Dec. 1–4, 1988, Conference Record, vol. 3, pp. 0767–0772.

H. Opderbeck "Throughout Degredations for Single Packet Messages", Request for Comments 632, ftp://ftp.isi.edu/in–notes/rfc632.txt, May 20, 1974, pp. 1–6.

Henning Schulzrinne "Voice Communication Across the Internet: A Network Voice Terminal", Jul. 29, 1992, pp. 1–34.

Hiroshi Kobayashi and Hideaki Haruyama, "Voice, Data and Video Integrated Broadband Metropolitan Area Network", Electronics and Communications in Japan, Part 1, vol. 73, No. 11, 1990, pp. 34–42.

Hiroyuki Ichikawa et al. "High–Speed Packet Switching Systems for Multimedia Communications", IEEE Journal on Selected Areas in Communications, Oct. 1987, vol. SAC–5, No. 8 (ISSN 0733–8716), pp. 1336–1345.

Ian H. Merritt "Providing Telephone Line Access to a Packet Voice Network", University of Southern California, Marina Del Rey. Information Sciences Inst., Feb. 1983, ADA126270.

International Search Report issued Jan. 27, 1998 in corresponding International Application Serial No. PCT/US96/15504.

Israel Gitman, et al. "Economic Analysis of Integrated Voice and Data Networks: A Case Study" Proceedings of the IEEE, vol. 66, No. 11, Nov. 1978, pp. 1549–1570.

J. Huelamo, et al. "End User Premises Equipment and Terminals for Broadband Applications", Electrical Communication, vol. 64, No. 2/3, 1990.

J.K. Reynolds et al., Voice File Interchange Protocol (VFIP), Request for Comments 978, ftp://ftp.isi.edu/innotes/rfc978.txt, Feb. 1986, pp. 1–5.

J. Romkey "A Nonstandard For Transmission of IP Datagrams Over Serial Lines: Slip", Request for Comments 1055, ftp/ftp.isi.edu/in–notes/std/std47.txt, Jun. 1988, pp. 1–6.

James D. Mills, et al. "A data and voice system for the general service telephone network", Proceedings IECON '87, 1987 International Conference on IND. Electronics, Control, and Instrumentation, Cambridge, Massachusetts, Nov. 3–6, 1987.

James W. Forgie"Speech Transmission in Packet–Switched Store–and–Forward Networks", AFIPS Conference Proceedings, 1975 National Computer Conference, May 19–22, 1975, Anaheim, California, pp. 137–142.

James W. Forgie "Voice Conferencing in Packet Networks", ICC '80, Conference Record, International Conference on Communications, Seattle, WA, Jun. 8–12, 1980, vol. 1, 80CH1505–6 CSCB, pp. 21.3.1–21.3.4.

Jane's Military Communications 1979–80, pp. 452 and 453.
Jane's Military Communications 1985, pp. 585, 546, and 545.

Jane's Military Communications 1989, Tenth Edition, Edited by John Williamson, ISBN 0710608772, pp. 443, 507, and 512.

Jane's Military Communications 1990–91, Eleventh Edition, Edited by John Williamson, ISBN 0710609000, p. [30], 264, 357, 398, 406, 450, 454, 560, 572, 573, 814, 815, and 816.

Jane's Military Communication 1992–93, Thirteenth Edition, Edited by John Williamson, ISBN 0710609809, pp. 375, 376, 384, and 704.

Jim Stevens, "Much More Idle Chatter About Reference Models", http://www–mice.cs.ucl.ac.uk/multimedia/misc/tcp_ip/8709.mm.www/0041.html, Dec. 18, 1987, pp. 1–9.

John Bellamy, "Digital Telephony", c1982 John Wiley & Sons, Inc., pp. 392–397 and 410–412.

K. Sohraby, et al. "ISDN Primary Rate Interface Impact on Performance of Integrated Voice and Data on CSMA/CD Networks—A Measurement and Simulation Study", Globecom '90 IEEE Global Telecommunication Conference & Exhibition, San Diego, California, Dec. 2–5, 1990, vol. 2, pp. 0912–0919.

Ken Sherman "Data Communications—A User's Guide", 3rd Edition, c1981 Prentice–Hall, Inc., pp. 296–307 and 404–407.

Kevin Jeffay, et al. "Kernel Support for Live Digital Audio and Video", pp. 10–21, University of North Carolina at Chapel Hill, Department of Computer Science.

Kyuta Saito, et al. "Voice Packet Communication System for Private Networks", Globecom '89, IEEE Global Telecommunications Conference & Exhibition, Dallas, Texas, Nov. 27–30, 1989, vol. 3, pp. 1874–1878.

Lawrence G. Roberts "Evolution of Packet Switching", Proceedings of the IEEE, vol. 66, No. 11, Nov. 1978, pp. 1307–1313.

Lin, Hwa–Chun and C.S. Raghavendra, "A Dynamic Load–Balancing Policy With a Central Job Dispatcher (LBC), "IEEE Transactions on Software Engineering, vol. 18, No. 2, Feb. 1992, pp. 148–158.

M. E. Ulug, et al. "Statistical Multiplexing of Data and Encoded Voice in a Transparent Intelligent Network", Fifth Data Communication Symposium, Sep. 27–29, 1977, Snowbird, Utah, pp. 6–14–6–20.

M. Gopalakrishnan, et al. "Integrating Voice and Data SALAN: An Experimtental Local Area Network", Computer Communications, vol. 9, No. 4, Aug. 1986, pp. 186–194 and p. 169.

M.J. Ross "Alternatives for Integrating Voice and Data", 1981 International Switching Symposium, ISS' 81 CIC Montreal, Sep. 21–25, 1981.

Natesa Janakiraman "An Overview of Recent Developments in the Designs and Applications of Customer Premises Switches", IEEE Communications Magazine, Oct. 1985, vol. 23, No. 10, pp. 32–45.

P. Borgnis–Desbordes, et al. "Variable–Speed Data Transmission", IBM Technical Disclosure Bulletin, vol. 27, No. 4A, Sep. 1984, pp. 2269–2270.

P. Venkat Rangan and Daniel C. Swinehart, "Software Architecture for Integration of Video Services in the Etherphone System", IEEE Journal on Selected Areas in Communication, vol. 9, No. 9, Dec. 1991, pp. 1395–1404.

Philip H. Reagan, "Is it the PBX or is it the LAN?", Datamation, The Telecom Manager Emerges, Mar. 1984, vol. 30 No. 3, pp. 3–4, 147, 148, 150.

Polle T. Zellweger et al., "An Overview of the Etherphone System and its Applications", 2nd IEEE Conference on Computer Workstations, Mar. 7–10, 1988, pp. 160–168.

R. Braudes et al., "Requirements for Multicast Protocols", Request for Comments 1458, Network Working Group, May 1993, pp. 1–19.

R. W. Meba, et al. "Experiments in Wideband Packet Technology", Digital Communications—New Directions in Switching and Networks, Proceedings of the International Seminar, Zurich, Switzerland, Mar. 11–13, 1986, pp. 135–139.

R.P. McNamara, "Some Considerations of the Voice–Data Capabilities of Broadband Cable Networks", IEEE Digest of Papers Spring CompCon 82, Feb. 22–25, 1982, pp. 312–314.

Randy Cole "Packet Voice: When It Makes Sense", Speech Technology, Sep./Oct. 1982, pp. 52–61.

Scott Flinn, "Coordinating Heterogeneous Time–Based Media Between Independent Applications" ACM Multimedia 95—Electronic Proceedings Nov. 5–9, 1995, pp. 1–16.

Shimmi Hattori et al., "Integrated Digital Switching System with Queueing Storage Facility", IEEE Transactions on Communications, vol. Com–30, No. 8, Aug. 1982, pp. 1900–1905, (ISSN 0090–6778).

Steve Oltmanns, et al. "A Voice and Communications System for the IBM PC", Speech Technology, Mar./Apr. 1986, pp. 94–99.

Stuart Cheshire et al., "Internet Mobility 4×4", www.acm.org, 1996, pp. 1–12.

Susan Angebranndt et al., "Integrating Audio and Telephony in a Distributed Workstation Environment", Proceedings of the Summer 1991 USENIX Conference, Jun. 10–14, 1991, Nashville, Tennessee, pp. 419–435.

T. Kamae "Visual Terminals and User Interfaces", FGCS North–Holland, pp. 257–278.

T. Kamae "Voice/Data Integration in the INS Model System and Local Area Networks" IEEE Communications Magazine, Dec. 1986, vol. 24, No. 12, pp. 7–15.

T7540 Digital Telephone Codec, AT&T Microelectronics, Jan. 1991, pp. 1–62 and Data Sheet Addendum, Jul. 1991, 4 pages.

Takashi Yamada, et al. "New Technologies—Multimedia High–throughput X.25 Packet Switching System", NTT Review, vol. 1, No. 2, Jul. 1989, pp. 82–88.

Theodore Bially, et al. "Voice Communication in Integrated Digital Voice and Data Networks", IEEE Transactions on Communications, vol. Com–28, No. 9, Sep. 1980, pp. 1478–1490.

Toru Tsuda, et al. "An Approach to Multi–Service Subscriber Loop System Using Packetized Voice/Data Terminals" ISSLS '78, The International Symposium on Subscriber Loops and Services, Mar. 20–24, 1978, Atlanta, Georgia. Conference Record, pp. 161–165.

V. Jacobson, et al. "TCP Extension for High–Speed Paths", Request for Comments 1185, ftp://ftp.isi.edu/in–notes/rfc1185.txt, Oct. 1990, pp. 1–21.

V. Jacobson, et al. "TCP Extensions for High Performance", Request for Comments 1323, ftp://ftp.isi.edu/in–notes/rfc1323.txt, May 1992, pp. 1–37.

Vinton G. Cerf, "Packet Satellite Technology Reference Sources", Request for Comments 829, Nov. 1982, http://www.cis.ohio–state.edu/htbin/rfc/rfc829.html, pp. 1–5.

VocalTec Internet Phone (TM) Version 2.5 Readme, VocalTec Ltd., Feb. 1995, 5 pages.

After Downsizing: Overcoming Client–Server Chaos (May 21, 1994).

Barrow Street Research report on New Paradigm Software Corp. (dated Sep. 20, 1995).

Camelot Corps Shining Internet Dream Draws Skeptics (Aug. 1995).

Correspondence with MacZone (Aug.–Sep. 1995).

DigiPhone and Camelot Documents.

DigiPhone Documents (including Q and A) (prior to Sep. 1995).

DigiPhone Documents (prior to Sep. 1995).

DigiPhone for Mac (1996).

Electric Magic and Jabra Correspondence relating to new products (prior to Sep. 1995).

Electric Magic and PSINet License Negotiation Documentation (prior to Sep. 1995).

Electric Magic Company Releases NetPhone 1.2 and NetPub Server (dated Jun. 8, 1995).

Electric Magic Information (May 1995).

Electric Magic Notebooks (prior to Sep. 1995).

Electric Magic Notes (including references to Apr. 18, 1995) and patent pending.

Electric Magic Notes (including references to DigiPhone) (prior to Sep. 1995).

Electric Magic Press Release (dated Mar. 13, 1995).

ElectricMagic and WebKat Licensing Documents (Sep. 1995 and prior).

Fax dated May 31, 1995 to IVP including press releases.

Google Groups comp.dcom.videoconf posting (dated Jul. 5, 1995).

intern.tex (dated Aug. 30, 1994).

Jabra—Corporate and Product Backgrounder (Apr. 19, 1995).

Jabra Ear Phone Common Questions and Answers.

Jabra Ear Phone PC, 1995.

Jabra Streamline Ear phone, 1993.

List of source modules in NetPhone (dated Oct. 10, 1995).

Maven Readme (including 1994 copyright notice).

Net as Phone (Internet World Jul. 1995).

Net Phone ad (with Jabra fax line) (May 1995).

NetPhone 1.1 User Manual (including date Jan. 9, 1995).

NetPhone Advertisement (Aug. 1995).

NetPhone Development Plan (SKYPE–N2P01610487).

NetPhone Development Plan with the charts (including reference to May 9, 1995).

NetPhone Digital User Manual (dated Feb. 26, 1995).

NetPhone gives your Mac voice over the Internet (Inside the Internet—Jun. 1995).

Netphone invoices (including invoices prior to Sep. 1995).

NetPhone Make Free Calls over the Internet (undated).

NetPhone Tasks and Plans (dated Jan.–Feb. 1995).

Open Systems Today, Feb. 20, 1995.

Order for NetPhone version 1.2 labels (dated Jun. 6, 1995).

Phoneless Phoning Apr. 2, 1995.

PowWow Chunked Protocol Specification, Last edited Mar. 12, 1999.

PowWow Native Protocols, last updated Dec. 8, 1998.

Roadmap for the Internet (Mar. 1995).

SlipMagic Ad for MacZone (dated Sep. 28, 1995) for selling product.

The Mac Zone (Catalog) dated 1995.

Two–way voice calls over the Internet (Nov. 21, 1994).

Ublique documents relating to Virtual Places Products (dated 1995 and Mar. 1995).

Ubique Ships Virtual Places Client and Server (dated Mar. 20, 1995).

Ubique, Ltd. Fact Sheet (referencing NetPhone codecs and Vocaltec) (date unknown).

Welcome to Netphone Demo (includes copyright date 1994).

David Strom, "Talking Telephony", Windows Sources, Ziff–Davis Publishing Company, Sep. 1996, vol. 4, No. 9, pp. 6, 7, 10, 150–152, 157, 158, 163, 167, 169, 171, 174, 181, 184, 186, 195, 203, 208.

Emad Farag et al., "Structure and network control of a hierarchical mobile network architecture", IEEE Fourteenth Annual International Phoenix Conference on Computers and Communications, Mar. 1995, ISBN: 0–7803–2492–7, p. 671–677.

English translation of JP–06–62020 (dated Mar. 4, 1994).

Huanxu Pan et al., "Analysis of a CCSS#7 Network supporting database services", IEEE International Conference on Information Engineering, Sep. 1993, ISBN: 0–7803–1445–X, pp. 193–197, vol. 1.

John E. Goodwin, Project Gutenberg Alpha Edition of Email 101, http://metalab.unc.edu/pub/docs/books/gutenberg/etext93/email025.txt, Jul. 1993.

Junichi Kimura, et al. "Voice/Data Multiplexing Transmission Methods", Kokai Japanese Patent, Kokai Sho 59–44140, pp. 205–215, with English Abstract, English Translation, pp. 1–24.

Mark R. Brown et al. "Special Edition: Using Netscape 2", Que Publishing, 1995, ISBN 0–7897–0612–1, pp. 7–35, 37–56, 78, 83, 176, 301–320, 393, 395–467, 469–506.

Preston Gralla, "How the Internet Works", Ziff–Davis Press, Emeryville, CA, c1997, pp. 34–37, 202–205, 214–215 and 272–275, ISBN 1–56276–552–3.

VocalChat GTI Information file, believed to be included with VocalChat GTI version 2.12 dated Sep. 1994.

VocalChat GTI README.TXT for Version 2.12 Beta, dated Sep. 1994.

VocalChat GTI Troubleshooting.Inf, believed to be included with VocalChat GTI version 2.12 dated Sep. 1994.

"A Low Cost Solution for: Using your WAN as a Voice Communication Tool" VocalTech White Paper (dated Jun. 3, 1994).

"CyberPhone Annoucement" Internet Posting in Newsgroups comp.speech, Jun. 8, 1995.

"CyberPhone!" Internet Posting in Newsgroups comp.speech, Apr. 14, 1995.

"Electric Magic Company Provides Internet Alternative to Long–Distance Calls", Electric Magic Company Press Release (Mar. 13, 1995).

"Electric Magic Company Releases NetPhone 1.2 and Netpub Server", Electric Magic Company Press Release (Jun. 1995).

"Frequently–Asked Questions about Tribal Voices Pow-Wow" Version 0.34, Mar. 4, 1996.

"Frequently–Asked Questions about Tribal Voices Pow-Wow" Version 0.43, May 1, 1996.

"Frequently–Asked Questions about Tribal Voices Pow-Wow" Version 0.45, May 31, 1996.

"Frequently–Asked Questions about Tribal Voices Pow-Wow" Version 0.47, Jun. 12, 1996.

"Frequently–Asked Questions about Tribal Voices Pow-Wow" Version 0.48, Jun. 25, 1996.

"Frequently–Asked Questions about Tribal Voices Pow-Wow" Version 0.59, Oct. 30, 1996.

"NetPhone Gets Internet Users Talking at Local Rates" MacUser UK, Mar. 3, 1995, p. 27.

"NetPhone Gives Your Mac Voice Over the Internet" Inside the Internet Rocket Science for the Rest of Us. vol. 2 No. 3, Jun. 1995.

"NetPhone" MacWorld, Jul. 1995.

"NetPhone"West Coast Online, Ver. 3.02 (#26), Apr. 1995.

"PowWow 1.3b Now Available!" Google Newsgroup comp.os.ms–windows.misc Discussion Posting (dated Apr. 22, 1995).

1996–1997 Buyer's Guide, CTI for Management.

Abbe Cohen, Inessential Zephry (Aug. 23, 1993).

Adam Gaffin, VocalTech Ware Lets Users Make Voice Calls over 'Net, Network World (Feb. 13, 1995).

Alexander Schill, ed., DCE—The OSF Distributed Computer Environment: Client/Server Model and Beyond, Lecture Notes in Computer Science 731, Karlsruhe University (1993).

Analysis of DCE Security Draft (Sep. 18, 1996).

Andrew D. Birrell, et al., Grapevine: An Exercise in Distributed Computing, Communications of the ACM (Apr. 1982).

Andrew D. Birrell, et al., Grapevine: An Exercise in Distributed Computing, Communications of the ACM, vol. 25, No. 4, Apr. 1982.

Andrew D. Birrell, et al., Implementing Remote Procedure Calls, ACM Transactions on Computer Systems (Feb. 1984).

Andrew S. Tanenbaum, Computer Networks, 2d ed. (Prentice–Hall, 1988).

Andy Patrizio, Telecom, Digital Limits Begin to Blur with 'Phone Calls' Across Internet, PC Week, vol. 12, No. 6 (Feb. 13, 1995).

Antonio Ruiz, Voice and Telephony Applications for the Office Workstation, IEEE 1st International Conference on Computer Workstations, San Jose, California (Nov. 11–14, 1985).

AVC–650: Technical Issues Concerning Real–Time Protocol in H.32Z Systems in ATM and Other Packet–Switched Computer Networks, Jul. 9, 1994.

AVC–655: Communication Procedure for H.222.1, Jul. 1, 1994.

AVC–666: H.32X Communication Modes, Terminal Types and Interworking Scenarios, Jul. 1994.

AVC–683: Update Draft H.32Z Following Grimstad Meeting, Nov. 1994.

AVC–696: An Example of Call Setup Procedure in a H.32Z Terminal, Nov. 1994.

AVC–702: Terminal to Terminal Signaling in H.32X, Oct. 24, 1994.

AVC–707R: Report of the Seventeenth Experts Group Meeting in Singapore (Jul. 1–11, 1994)—Part 1 and Part II, Nov. 11, 1994.

AVC–716: Draft Recommendation H.32X, Jan. 1995.

AVC–718: Draft H.32X, Jan. 1995.

AVC–743P: Report of the Eighteenth Experts Group Meeting in Kamifukuoka (Jan. 24–27, 1995), Jan. 27, 1995.

AVC–748: Update of Draft Recommendation H.322, May 1995.

AVC–750: Report of the Study Group 15 Meeting Held During Feb. 6–17, 1995, Feb. 24, 1995.

AVC–752: Open Issues Towards the Stockholm Meeting, Mar. 17, 1995.

AVC–758: Draft Recommendation H.323 Visual Telephone Systems and Terminal Equipment for Local Area Networks Which Provide A Non–Guaranteed Quality of Service, Rev. May 12, 1995.

AVC–767: Logical Channel Set–up Procedure, Apr. 28, 1995.

AVC–799: Comments on Draft H.323 and H.22Z, May 11, 1995.

AVC–800R: Report of the Nineteenth Experts Group Meeting in Haninge (May 15–18, 1995), May 18, 1995.
AVC–813: Signaling Recommendation Within the Scope of H.323, Sep. 10, 1995.
AVC–819: LAN Addressing Plan in H.323, Sep. 10, 1995.
AVC–830: Connection Management Procedures for H.323, Oct. 24–27, 1995.
AVC–842: Gateway, Gatekeeper and Terminal Procedures in H.323, Oct. 17, 1995.
Avnish Aggarwal, et al., RFC 1002: Protocol Standard for a NetBIOS Service on a TCP/UDP Tansport: Detailed Specifications (Mar. 1987).
Barbara Darrow, Internet Phone Chat Software Prompts Spat; IRC Operators Rebuffed Use of Their Systems, Computer Reseller News (Mar. 20, 1995).
Barry Michael Arons, The Audio–Graphical Interface to a Personal Integrated Telecommunications Systems, Masters Thesis, Massachusetts Institute of Technology (Jun. 1984).
Barry Phillips, Casting the Net for New Media, OEM Magazine, No. 320 (1995).
Belville, Sharon, "Zephyr on Athena", Athena Documentation, Sep. 10, 1991, Version 3.
Ben Mesander, et al., The Client–To–Client Protocol (Aug. 12, 1994).
Bill Welsh, H.245 Implementors' Guide (undated but references Apr. 1996).
Bob Blakley's Email to sig–dce–security, DCE Delegation Proposal Review, Jul. 7, 1992.
Brad Curtis Johnson, A Distributed Computing Environment Framework: An OSF Perspective (1991).
Brent Nordin, et al., Remote Operation Across a Network of Small Computers (Association of Computing Machinery, 1986).
Brian Fox, et al., GNU Finger program documentation, Free Software Foundation (1992).
Bruce Brown, BugNet Bug/Fix List, Newsbytes (Dec. 13, 1995).
Bruce Brown, BugNet Bug/Fix List, Newsbytes (Dec. 13, 1996).
Butler W. Lampson, et al., A Distributed Systems Architecture for the 1990's (Dec. 17, 1989).
Buy Memory Configured Expressly for Your Computer, San Jose Mercury News (Jul. 16, 1995).
C. Anthony DellaFera, et al., Section E.4.1: Zephyr Notification Services, Athena Technical Plan (Jul. 29, 1988).
C. Anthony DellaFera, et al., Section E.4.1: Zephyr Notification Service, Project Athena Technical Plan (Jun. 5, 1989).
C. Anthony DellaFera, et al., The Athena Notification Service: Zephyr (1987).
C. Anthony DellaFera, et al., The Athena Notification Service: Zephyr (Dec. 31, 1987).
C. Anthony DellaFera, et al., The Zephyr Notification Service (undated).
C. Anthony DellaFera, et al., The Zephyr Notification Service, Usenix Winter Conference, Feb. 9–12, 1988.
C. Anthony DellaFera, The Zephyr Notification Service, MIT Project Athena, Winter USENIX Conference (Feb. 12, 1988).
C. Malamud, et al., RFC 1528: Principles of Operation for the TPC.INT Subdomain: Technical Procedures (Oct. 1993).
C. Malamud, et al., RFC 1530: Principles of Operation for the TPC.INT Subdomain: General Principles and Policy (Oct. 1993).
C. Sunshine, et al., IEN 135: Addressing Mobile Hosts in the ARPA Internet Environment (Oct. 1985).
C. Yang, RFC 1789: INETPhone: Telephone Services and Servers on Internet (Apr. 1995).
Calls Waiting on the Internet Although Telephone Software Makes 'Free' Long Distance Possible, it's a Long Way from Practical, Kansas City Star (Jul. 14, 1996).
Carl Sunshine, IEN 178: Addressing Problems in Multi–Network Systems (Apr. 1981).
Charles E. Perkins, et al., A Mobile Networking System Based on Internet Protocol, IEEE Personal Communications (First Quarter 1994).
Charlie Kaufman's Email to dmackey re DCE 1.1 Delegation Proposal for Review, Jun. 22, 1992.
Chii–Ren Tsai, et al., Distributed Audit with Secure Remote Procedure Calls (1991).
Christopher Schmandt, et al., An Audio and Telephone Server for Multi–Media Workstations, IEEE (1988).
Christopher Schmandt, et al., Phone Slave: A Graphical Telecommunications Interface, Society for Information Display, 1984 International Symposium Digest of Technical Papers (Jun. 1984).
Chuck Kane, List of IRC servers as of Feb. 1, 1995, available at http://ftp.funet.fi/pub/unix/irc/does/servers.950201.
Clinton Wilder, Pulling in the Net—InfoSeek, VocalTec Offer Search and Voice Options to Internet Users Online, Informationweek, No. 516 (1995).
Common Desktop Environment 1.0—Advanced User's and System Administrator's Guide, Addison–Wesley Publishing Co. (1995).
Common Desktop Environment 1.0—User's Guide, Addison–Wesley Publishing Co. (1995).
Communications Connectivity Networking, Microsoft Systems Journal, vol. 10, No. 1 (Jan. 1995).
Comp.Speech FAQ Archive; Comp.Speech FAQ Web Page, Comp.Speech Newsgroup. Jul. 17, 1995).
Comp.Speech FAQ Weekly Reminder, Comp.Speech Newsgroup (Jun. 21, 1995).
Contents, Preface, and Index to Open Software Foundation, X/Open Preliminary Specification—X/Open DCE: Authentication and Security Services (Mar. 1996).
Conversation Except from ftp://svr–ftp.eng.camac.uk/pub/pub/comp.speech/archive/subjectt5xxx.txt accessed on Nov. 28, 2007.
Craig Crossman, Free Calls on Internet are CB–Style No Longer, Miami Herald (Jun. 26, 1995).
Craig Crossman, Make Long Distance Calls Via the Internet, Record (Jul. 3, 1995).
D. O'Mahoney, 1st Generation Internet Phones (1998).
D. Reed, RFC 1324: A Discussion on Computer Network Conferencing (May 1992).
D. Zimmerman, RFC 1288: The Finger User Information Protocol (Dec. 1991).
Dale Skran, Draft ITU–T Recommendation H.225.0—Line Transmission of Non–Telephone Signals, Media Stream Packetization and Synchronization on Non–Guaranteed Quality of Service LANs (May 28, 1996).
Dale Skran, ed. ASN.1 for H.225.0 (Jun. 18, 1996).
Dan Cohen, IEN 31: On Name, Addresses and Routings (II) (Apr. 28, 1978).
Dan Keating, Ring! It's Computer Calling Phone By Internet Has Gotten Better, Miami Herald (May 22, 1996).
Daniel C. Swinehart, Telephone Management in the Etherphone System, IEEE (1987).

Daniel H. Craft, Resource Management in a Decentralized System, Operating Systems Review, vol. 17, No. 5 (Association for Computing Machinery, Oct. 1983).

Danny Cohen, IEN 23: On Name, Addresses and Routings (Jan. 23, 1978).

Dave Lindbergh, H.323 Encryption, Document: CNC–96–22 (Apr. 15, 1996).

David D. Clark, RFC 814: Name, Addresses, Ports, and Routes (Jul. 1982).

David Gertler, Hardward and Software Tidbits from CEBIT, Seybold Report on Desktop Publishing, vol. 9, No. 8 (Apr. 3, 1995).

David Hafke, New on the Net—Talk It Up, Windows Magazine, No. 711 (1996).

David Harvey, All the News That's Fit to Speak, Netguide, No. 301 (1996).

David R. Cheriton, et al., Decentralized Naming Facility (Standard University, Feb. 1, 1986).

David R. Cheriton, The V Distributed System, Communications of the ACM, vol. 31, No. 3 (Apr. 1988).

David Rapp, I've Got to Get a Message to You, Instant Messaging Started as an MIT Computer–Science Department Project, Technology Review (2002).

DCE 1.0 Security Technology, architectural overview documents, Walter Tuvell, Feb. 1997.

DCE 1.1 Security Technology, architectural overview documents May 1994.

DCE RPC Internals and Data Structures (Aug. 1993).

Dean Adams, ed., Security Survival: An indispensable guide to securing your business, X/Open Co. (1996).

Decided H.225.0 (Jun. 19, 1996).

Derek C. Oppen, et al., The Clearinghouse: A Decentralized Agent for Locating Named Objects in a Distributed Environment (Association for Computing Machinery, 1983).

Description of New Zephyr Protocol (undated).

Digiphone Specifications, from Q1.11 of Section 1 of the comp.speech FAQ Home Page (dated Jan. 6, 1997).

Douglas B. Terry, et al., The Berkeley Internet Name Domain Server, USENIX Association Software Tools Users Group, Summer Conference, Salt Lake City, Utah (Jun. 12–15, 1984).

Douglas B. Terry, Structure freeName Management for Evolving Distributed Environments, IEEE 6th International Conference on Distributed Computing Systems, Cambridge, Massachusetts (May 19–23, 1986).

Douglas Brian Terry, Distributed Name Servers: Naming and Caching in Large Distributed Computing Environments, Ph.D. Thesis, University of California, Berkeley (Feb. 21, 1985).

Douglas E. Comer, Internetworking With TCP/IP: vol. 1: Principles, Protocols, and Architecture, 1st ed. (Prentice–Hall, 1988).

Douglas E, Comer, Internetworking With TCP/IP: vol. 1: Principles, Protocols, And Architecture, 3d ed. (Prentice–Hall, 1995).

Douglas E. Comer, Internetworking With TCP/IP: vol. 1: Principles, Protocols, and Architectures, 2d ed. (Prentice–Hall, 1991).

Douglas W. Johnson, Internet–Connected Phone Calls Dial in to Lower Prices, Computerworld (Feb. 19, 1996).

Draft ITU–T Recommendation G.723—Dual Rate Speech Coder for Multimedia Communications Transmitting at 5.3 & 6.3 KBIT/S (Oct. 17, 1995).

Draft ITU–T Recommendation H.323 Line Transmission of Non–Telephone Signals: Visual Telephone Systems and Equipment for Local Area Networks Which Provide a Non–Guaranteed Quality of Service, (May 28, 1996).

Draft Recommendation H.323 Visual Telephone Systems and Terminal Equipment for Local Area Networks Which Provide A Non–Guaranteed Quality of Service, Sep. 8, 1995.

Draft Recommendation H.323—Visual Telephone Systems and Equipment for Local Area Networks Which Provide A Non–Guaranteed Quality of Service (May 28, 1996).

E.D. Sykas, et al., Overview of the CCITT X500 Recommendations Series (Butterworth–Heinemann, 1991).

Electric Magic Company Sales Invoices, Feb. 23, 1995 thru Dec. 3, 1995.

Electric Magic Company, Beta Test License Agreement (dated May 30, 1995).

Elizabeth Feinler, et al., RFC 810: DoD Internet Host Table Specification (Mar. 1, 1982).

Ellen Massmer, PictureTel Brings Video to the Lan Network World (Sep. 4, 1995).

E–mail from Dale Skran to jtoga@ibeam.jf.intel.com, phone numbers for email list (Jan. 6, 1997).

E–mail from Dale Skran to jtoga@ibeam.jf.intel.com, mailing list to enter (Jan. 6, 1997).

E–mail from Ofer Shapiro to Bob Bell, et al., RE: Destination side gateway problem (Jul. 29, 1996).

E–mail from Sakae Okubo to Experts of ITU–T SG16 Q.12/16, Q.13/16 and Q.14/16, Notice of the Q.12–14/16 Sunriver meeting (Jul. 17, 1997).

Email from Sakae Okubo to yves.robin–champigneu10issy.cnet.fr, et al., Working tools of SG16 experts groups (May 8, 1997).

E–mail from Vineet Kumar to h323implementors@mailbag.jf.intel.com Receiver associating a logical channel with a RTP stream (Aug. 5, 1996).

Erdos, Marlena and Pato, Joseph, "Extending the OSF DCE Authorization System to Support Practical Delegation," Feb. 11, 1993.

Eric C. Rosen, IEN 183: Logical Addressing (May 1981).

Eric C. Rosen, IEN 188: Issues in Internetting Part 3: Addressing (Jun. 1981).

Etherphone: Collected Papers 1987–1988, Xerox PARC, CSL–89–2 (May 1989).

Eve M. Schooler, Case Study: Multimedia Conference Control in a Packet–Switched Teleconferencing System, Journal of Internetworking: Research and Experience, vol. 4, No. 2 (Jun. 1993).

Eve M. Schooler, et al., An Architecture for Multimedia Connection Management, Proceedings IEEE 4th Comsoc International Workshop on Multimedia Communications, MM '92, Monterey, California (Apr. 1992).

Eve M. Schooler, The Connection Control Protocol: Architecture Overview (Jan. 28, 1992).

Eve M. Schooler, The Connection Control Protocol: Specification, Version 1.1 (Jan. 29, 1992).

Eve M. Schooler, The Impact of Scaling on Multimedia Connection Architecture, Multimedia Systems, vol. 1 (Association for Computing Machinery, 1993).

Exportability of DCE Multi–Crypto Feature by Walter Tuvell, Mar. 5, 1996.

F. Anklesaria, et al., RFC 1436: The Internet Gopher Protocol (A Distributed Document Search and Retrieval Protocol) (Mar. 1993).

FAQ: How Can I Use the Internet as a Telephone, Ver. 0.2 (Apr. 27, 1995).
FAQ: How Can I Use the Internet as a Telephone, Ver. 0.4 (Feb. 23, 1996).
Fax from Ryan Holmquist to Dale Skran (May 30, 1996).
FLEXlm v3.0 Programmer's Guide, Globetrotter Software, Inc. (Aug. 1994).
Full Duplex Internet Voice Comms Available, Newsbytes (Feb. 14, 1995).
Gary A. Thom, H.323: The Multimedia Communications Standard for Local Area Networks, IEEE Communications Magazine (Dec. 2006).
Gilbert Held, The ABCs of IP Addressing, CRC Press LLC (2002).
Gligor, et al. "On Inter–realm Authentication in Large Distributed Systems" May 2, 1992.
Google Groups "CyberPhone" Search Results, search conducted on Nov. 28, 2007.
Goretsky, Aryeh "PowWow Quick Installation Guide", 1996.
Green, Andrew, NetPhone Tasks and Plans, Email, 2 pages (printed Feb. 2, 1995).
Greg Wood. Computer VAR Takes His First Computer Telephony Plunge; Computer Telephony (Sep. 1996).
Gursharan S. Sidu, et al., Inside AppleTalk, 2d ed. (Addison–Wesley Publishing Co., 1990).
H. Schulzrinne, et al., RFC 1889: RTP: A Transport for Real–Time Applications (Jan. 1996).
Handwritten Notes, Electric Magic Company (dated Jul. 22, 1994 thru Aug. 30, 1995).
Harrick M. Vin., et al., Multimedia Conferencing in the Etherphone Environment (IEEE, Oct. 1991).
How Can I use the Internet as a telephone? from Q1.11 of Section 1 of the comp.speech FAQ Home Page (dated Mar. 19, 1996).
Hussein M. Abdel–Wahab, XTV: A Framework for Sharing X Window Clients in Remote Synchronous Collaboration, IEEE Conference on Communications Software: Communications for Distributed Applications & Systems (Apr. 1991).
I C. Weider, et al., RFC 1727: A Vision of an Integrated Information Service (Dec. 1994).
Inder Gopal, et al., Directories for Networks with Casually Connected Users (IEEE, 1988).
Information Technology—Database Language SQL (Proposed revised text of DIS 9075), Digital Equipment Corp. (Jul. 1992).
InterFACE from Hijinx Specifications, from Q1.11 of Section 1 of the comp.speech FAQ Home Page (dated Mar. 19, 1996).
Internet Phone from VocalTec Specifications, from Q1.11 of Section 1 of the comp.speech FAQ Home Page (dated Mar. 19, 1996).
Internet Phone Release 4, Users Manual, VocalTec 1996.
Internet Telephone Companies Racing to Market, Voice Technology & Services News, vol. 14, No. 20 (Oct. 3, 1995).
Introduction to OSF DCE (Prentice–Hall, Inc., 1992).
ITU–T Recommendation X.500—Information technology—Open Systems Interconnection—The Directory: Overview of concepts, models and services (Aug. 1997).
ITU–T Recommendation X.501—Information technology—Open Systems Interconnection—The Directory: Models (Aug. 1997).
J. Oikarinan, et al., RFC 1459: Internet Relay Chat Protocol (May 1993).
J. Pato, Hierarchical Trust Relationships for Inter–Cell Authentication, Slides, (Jul. 7, 1992).
J. Pato, RFC 7.0: Hierarchical Trust Relationships for Inter–Cell Authentication (Jul. 1992).
J. Postel, et al., RFC 959: File Transfer Protocol (FTP) (Oct. 1985).
J. Postel, RFC 765: File Transfer Protocol (Jun. 1980).
J. Postel, RFC 925: Multi–LAN Address Resolution (Oct. 1984).
J. Saltzer, RFC 1498: On the Naming and Binding of Network Destinations (Aug. 1993).
Jack Rickard, Voice Over Internet—the Internet Phone, Boardwatch Magazine, vol. 9, No. 4 (Apr. 1995).
James M. Bloom, et al., Experiences Implementing BIND, A Distributed Name Server for the DARPA Internet (Jun. 9–13, 1986).
James Martin, et al., TCP/IP Networking: Architecture, Administration, and Programming (Prentice Hall, 1994).
James Staten, Netphone 1.2 Calls the Web, MACWEEk, vol. 9 No. 27 (Jul. 10, 1995).
Jennifer G. Steiner, et al., Kerberos: An Authentication Service for Open Network Systems, USENIX Winter Conference, Dallas, Texas (Feb. 9–12, 1988).
Joe Maloney, DCE: Focus on Security, the Internet and the Future (printed Apr. 25, 2002, date unknown).
Joe Pato, et al., Distributed Computing Environment (DCE) Design of the Security Services and Facilities (Aug. 10, 1992).
Joe Pato, Extending the DCE Authorization Model to Support Practical Delegation—Extended Summary (Jul. 7, 1992).
Joe Pato, RFC 3.0: Extending the DCE Authorization Model to Support Practical Delegation—Extended Summary (Jun. 1992).
Joe Pato, RFC 6.0: A Generic Interface for Extended Registry Attributes (Jun. 1992).
John A. Pershing, Jr., et al., IEN 162: Transport, Addressing, and Routing in the Wideband Net (Oct. 1980).
John F. Shoch, IEN 19: Inter–Network Naming, Addressing, and Routing (Jan. 1978).
John Ioannidis, et. al., IP–based Protocols for Mobile Internetworking, Columbia Univ., Dept. of Computer Science (1991).
John R. Pickens, et al., RFC 756: The NIC Name Server—A Datagram Based Information Utility (Jul. 1979).
John T. Kohl, The Zephyr Notification Service, First International Athena Technical Conference (Apr. 11, 1991).
John Veizades, et al., Service Location Protocol, Internet Draft (May 2, 1995).
Jon Hill, et al., Pow Wow, PC Magazine, vol. 15, No. 17 (Oct. 8, 1996).
Jon Hill, TeleVox, PC Magazine, vol. 15, No. 17 (Oct. 8, 1996).
Jon Livesey, Inter–process Communication and Naming in the Mininet System, Eighteenth Annual IEEE Computer Society International Conference, San Francisco, California (1979).
Jon Postel, RFC 921: Domain Name System Implementation Schedule—Revised (Oct. 1984).
José M. Bernabeu–Auban, et al., Optimizing a Generalized Polling Protocol for Resource Finding over a Multiple Access Channel, Computer Networks and ISDN Systems 27 (1995).

Josina M. Arfman, et al., Project Athena: Supporting Distributed Computing at MIT, IBM Systems Journal (1992).

K. Harrenstien, et al., RFC 811: Hostname Server (Oct. 1985).

K. Harrenstien, et al., RFC 952: DoD Internet Host Table Specification (Oct. 1985).

K. Harrenstien, RFC 742: Name/Finger (Dec. 30, 1977).

Kahane, Opher et al., "Call Management Agent System Specification"VoIP Forum Technical Committee Contribution (dated Aug. 15, 1996).

Karl Auerbach, et al., RFC 1001: Protocol Standard for a NetBIOS Service on a TCP/UDP Transport: Concepts and Methods (Mar. 1987).

Keith A. Lantz, et al., Towards a Universal Directory Service, 4th PODC Conference Proceedings (Association for Computing Machinery, 1985).

Ken Harrenstien, et al., RFC 811: Hostnames Server (Mar. 1, 1982).

Ken Harrenstien, RFC 811: Hostnames Server (Mar. 1, 1982).

Ken Harrenstien, RFC 812: Nickname/Whois (Mar. 1, 1982).

Kenneth Hart, Startups, industry mainstays add to Internet phone menu, Communicationsweek Int'l (Nov. 27, 1995).

Klaus Zeuge, et al., The Client–to–Client Protocol (CTCP) (published no later than Aug. 12, 1994).

Kohl, John T., "Zephyr Installation and Operation Guide", Draft—Nov. 20, 1989.

Koster, Steven "The Phone Companies Worst Nightmare" Hotwired, Apr. 1995.

L. Landweber, et al., Architecture of the CSNET Name Server (Association for Computing Machinery, 1983).

L. Peter Deutsch, RFC 606: Host Names On–Line (Dec. 1973).

Larry L. Peterson, A Yellow–Pages Service for a Local–Area Network (Association for Computing Machinery, 1988).

Larry L. Peterson, The Profile Naming Service, ACM Transactions on Computer Systems, vol. 6, No. 4, (Nov. 1988).

Lisa Zahn, et al., Network Computing Architecture, Prentice Hall (1990).

List of Names from a DCE Meeting: attendees from DISA, OSF, DEC, Mitre, HP, Open Market and others (undated).

Listsery posting by Jon Postel, Dynamic Updated Proposal, dated Sep. 1 and 9, 1993.

Listsery postings by Susan Thomson, DNS Dynamic Updates, dated Jul. 14, 1994.

Lon Wagner, New Software Lets Users Talk for Cheap, Virginian–Pilot (Mar. 26, 1995).

M. Bever, et al., Distributed Systems, OSF DCE, and Beyond (1993).

M.D. Kudlick, RFC 608: Host Names On–Line (Jan. 10, 1974).

Making the Most of IP Telephony, VocalTec Annual Report 1997.

Mark Crispin, RFC 752: A Universal Host Table (Jan. 2, 1979).

Mark Reid, Ptell Call Control Procedure in H.323 (Jun. 16, 1995).

Markus Sohlenkamp & Greg Chwelos, Integrating Communication, Cooperation, and Awarness: The DIVA Virtual Office Environment (1994).

Mic Bowman, et al., Univers: An Attribute–based Name Server, Software Practice and Experience, vol. 20(4) (Apr. 1990).

Michael D. Schroeder, et al., Experience with Grapevine: The Growth of a Distributed System, ACM Transactions on Computer Systems (Feb. 1984).

Michael D. Schroeder, et al., Experience with Grapevine: The Growth of a Distributed System, ACM Transactions on Computer Systems, vol. 2, No. 1 (Feb. 1984).

Michael F. Schwartz, et al., A Comparison of Internet Resource Discovery Approaches, Computing Systems (Aug. 1992).

Michael F. Schwartz, et al., A Name Service for Evolving, Heterogeneous Systems, ACM (1987).

Michael J. Bibeau, A Formative Evaluation of CU–SeeMe, Masters Thesis, Virginia Polytechnic Institute and State University (Feb. 20, 1995) (including CU–SeeMe Users Manual by same author published Jan. 1995).

Michelle Slatalla, Hold the Phone! You can Call Long Distance on a Computer For Pennies, But it has its Drawbacks, Newsday (Mar. 14, 1995).

Mike Kong, et al., Network Computing System Reference Manual, Prentice Hall (1990).

Mike Kudlick, et al., RFC 627: ASCII Text File of Hostnames (Mar. 25, 1974).

Mitch Wagner, Phone Home Cheaply Over the I–Way, Open Systems Today (Feb. 20, 1995).

Mitre Fort Meade Site DCE Meeting Sign In Sheet Jan. 16, 1995.

Mostafa H. Ammar, et al., Using Hint Tables to Locate Resources in Distributed Systems (IEEE, 1988).

Motorola Micro TAC International 5000 Series Manual (undated).

Motorala Micro TAC International 7000 Series (dated May 1994).

Motorola Micro TAC International 7500 Series (undated).

Motorola Micro TAC International 8000 Series (undated).

Nate Zelnick, Chat on the Web: An Overview, Interactive Content, vol. 2, No. 17 (Sep. 1995).

Nautilius: Secure Computer Telephony, from Q1.11 of Section 1 of the comp.speech FAQ Home Page (dated Aug. 7, 1996).

NetPhone 1.0 User Manual, Electric Magic Company (document includes date Dec. 31, 1994).

NetPhone 1.1 User Manual, Electric Magic Company (document includes date Feb. 16, 1995).

NetPhone Demo Instructions, Electric Magic Company, 1994.

NetPhone Devleopment Plan (undated).

NetPhone Development Plan v0.1 (undated).

NetPhone Digital User Manual, Electric Magic Company, Feb. 26, 1995.

NetPhone Digital User Manual, Electric Magic Company, Mar. 12, 1995.

NetPhone Information Manual, Electric Magic Company, May 30, 1995.

NetPhone Testing Notes, Sep. 28, 1994.

Netphone, Change Notes, Dec. 6.

Nigel Hinds, et al., Name Space Models for Locating Services, IBM Canada Laboratory Technical Report 74.074 (1991).

Norbert Leser, Towards a Worldwide Distributed File System: The OSF DCE File System as an example (Sep. 27, 1990).

Open Group, Cambridge Information (Jun. 23, 1997).

Open Software Foundation Security Sig (Mar. 19, 1996).

Open Software Foundation, AES/Distributed Computing RPC Volume, PTR Prentice Hall (1994).
Open Software Foundation, DCE Internals Course, Instructor Guide vol. 1 (1992).
Open Software Foundation, DCE Internals Course, Instructor Guide vol. 2 (1992).
Open Software Foundation, Industry Analysis of DCE (May 15, 1990).
Open Software Foundation, Introduction to OSF DCE, Prentice Hall (1992).
Open Software Foundation, Open Line Magazine (May/Jun. 1990).
Open Software Foundation, OSF DCE Administration Guide Core Components, PTR Prentice Hall (1993).
Open Software Foundation, OSF DCE Administration Guide—Extended Services, PTR Prentice Hall (1993).
Open Software Foundation, OSF DCE Administration Guide—Introduction, PTR Prentice Hall (1993).
Open Software Foundation, OSF DCE Administration Reference, PTR Prentice Hall (1993).
Open Software Foundation, OSF DCE Application Development Guide, PTR Prentice Hall (1993).
Open Software Foundation, OSF DCE Application Development Reference, PTR Prentice Hall (1993).
Open Software Foundation, OSF DCE User's Guide and Reference, PTR Prentice Hall (1993).
OSF DCE User's Guide and Reference (Prentice–Hall, Inc., 1993).
P. Deutsch, et al., RFC 1835: Architecture of the Whois++ Service (Aug. 1995).
P. Faltstrom, et al., RFC 1914: How to Interact with a Whois++ Mesh (Feb. 1996).
P. Mockapetris, RFC 882: Domain Names—Concepts and Facilities (Nov. 1983).
P. Mockapetris, RFC 883: Domain Names—Implementation and Specification (Nov. 1983).
P. Venkat Rangan, et al., Software Architecture for Integration of Video Services in the Etherphone System, IEEE Journal on Selected Areas in Communications, vol. 9, No. 9 (Dec. 1991).
P.M. Gopal, et al., Consistent Resource Registration, IBM Technical Disclosure Bulletin, vol. 37, No. 9 (Sep. 1994).
Part 1 of Open Software Foundation, X/Open Preliminary Specification—X/Open DCE: Authentication and Security Services (Mar. 1996).
Part 2 chapter 2 thru 5 of Open Software Foundation, X/Open Preliminary Specification—X/Open DCE: Authentication and Security Services (Mar. 1996).
Part 2 chapter 6 thru 13 of Open Software Foundation, X/Open Preliminary Specification—X/Open DCE: Authentication and Security Services (Mar. 1996).
Part 3 and Part 4 of Open Software Foundation, X/Open Preliminary Specification—X/Open DCE: Authentication and Security Services (Mar. 1996).
Pato, Joseph N., A Generic Interface for Extended Registry Attributes, Jul. 7, 1992.
Paul Albitz, et al., DNS and Bind in a Nutshell (O'Reilly & Associates, 1992).
Paul Mockapetris, RFC 1034: Domain Name—Concepts and Facilities (Nov. 1987).
Paul Mockapetris, RFC 1035: Domain Name—Implementation and Specification (Nov. 1987).
Paul V. Mockapetris, et al., Development of the Domain Name Server, Computer Communication Review, vol. 18, No. 4, (Aug. 1988).
Paul V. Mockapetris, et al., Development of the Domain Name System, Computer Communication Review (Aug. 1988).
Phoning By Web, San Francisco Chronicle (Mar. 12, 1996).
PictureTel Corp., 10–K405/A (filed Jan. 13, 1988).
PictureTel LiveLan (printed Dec. 3, 2007).
Ping Lin's Email to mackey, comments on DCE 1.1 Delegation RFC, Jul. 2, 1992.
Polle T. Zellweger, et al., An Overview of the Etherphone System and its Applications (IEEE, 1988).
Postel, RFC 791: Internet Protocol: Darpa Internet Program Protocol Specification (Sep. 1981).
Postel, RFC 793: Transmission Control Protocol: Darpa Internet Program Protocol Specification (Sep. 1981).
PowWow For Microsoft windows User's Guide, Version 1.4B, Documentation by Token White Man (dated 1995).
PowWow For Microsoft Windows User's Guide, Version 1.5, Documentation by Aryeh Goretsky (dated 1995).
PowWow For Microsoft Windows User's Guide, Version 1.6 beta 2, Documentation by Aryeh Goretsky (dated 1995).
PowWow For Microsoft Windows User's Guide, Version 1.6 beta, Documentation by Aryeh Goretsky (dated 1995).
PowWow For Microsoft Windows User's Guide, Version 1.7 beta 1, Documentation by Aryeh Goretsky (dated 1995).
PowWow For Microsoft Windows User's Guide, Version 1.7 beta 2, Documentation by Aryeh Goretsky (dated 1995).
PowWow For Microsoft Windows User's Guide, Version 1.7 beta 3, Documentation by Aryeh Goretsky (dated 1995).
PowWow For Microsoft Windows User's Guide, Version 1.7 beta 4, Documentation by Aryeh Goretsky (dated 1995).
PowWow For Microsoft Windows User's Guide, Version 2.0 beta 1, Documentation by Aryeh Goretsky (dated 1995, 1996).
PowWow For Microsoft Windows User's Guide, Version 2.1, Documentation by Aryeh Goretsky (dated 1995, 1996).
PowWow For Microsoft Windows User's Guide, Version 2.2 beta 1, Documentation by Aryeh Goretsky (dated 1995, 1996).
PowWow For Microsoft Windows User's Guide, Version 2.2 beta 2, Documentation by Aryeh Goretsky (dated 1995, 1996).
PowWow For Microsoft Windows User's Guide, Version 2.3 Documentation by Aryeh Goretsky (dated 1995, 1996).
PowWow For Microsoft Windows User's Guide, Version 2.31, Documnetation by Aryeh Goretsky (dated 1995, 1996).
PowWow For Microsoft Windows User's Guide, Version 2.32, Documentation by Aryeh Goretsky (dated 1995, 1996).
PowWow For Microsoft Windows User's Guide, Version 3.0 beta 3, Documentation by Aryeh Goretsky (dated 1995, 1996).
PowWow User Local Server Version 1.0 beta 2 Release Notes (Dated Jun. 18, 1996).
PowWow User Location Server for Microsoft Windows NT and 95 Version 1.0 beta 2 Installation Guide, by Gorestsky, Aryeh (dated 1996).
PowWow Version Release Notes (covering versions 1.4b to 2.32) (dated Jun. 26, 1996).
PowWow32 Release Notes (PowWow Versions 3.0 beta 3 and 3.0 beta 2) (dated Nov. 21, 1996).
Prospectus for VocalTech Ordinary Shares, Feb. 6, 1996.

Questions and Commnets: DCE RFC 6.0 "A Generic Interface for Extended Registry Attributes" Commentary by Bob Blakley, Jul. 6, 1992.
R. Braden, RFC 1644 T/CP—TCP Extensions for Transactions Functional Specifications (Jul. 1994).
R. Droms, RFC 1531: Dynamic Host Configuration Protocol (Oct. 1993).
R. Droms, RFC 1541: Dynamic Host Configuration Protocol (Oct. 1993).
R.C. Summers, Local–Area Distributed Systems, IBM Systems Journal, vol. 28, No. 2 (1989).
Raj Pandya, Emerging Mobile and Personal Communication Systems, IEEE Communications Magazine (Jun. 1995).
RFC 1001: Protocol Standard for the NetBIOS Service on a TCP/UDP Transport: Concepts and Methods, Mar. 1987.
RFC 1057: RPC Remote Procedure Call Protocol Specification Version 2, Jun. 1988.
Richard Karpinski, Internet Phones Battle for the Market, Interactive Age, No. 212 (1995).
Richard Karpinski, Upgrading Internet Phone—VocalTech Offer full–Duplex Version, Eliminating Voice Delays, Interactive Age, No. 216 (1995).
Richard T. Snodgrass, Developing Time–Oriented Database Applications in SQL, Morgan Kaufmann Publishers (2000).
Rivka Tadjer, Internet Communications Solutions: How Well Do They Work?, Computer Shopper, vol. 15, No. 6 (Jun. 1995).
Rivka Tadjer, Internet Phones to Upstage Videoconferencing Products?Talk is Cheaper with Local Worldwide Dialing, Computer Shopper, vol. 15, No. 5 (May 1995).
Rob Walters, Computer Telephone Integration (Artech House, 1993).
Robert E. Kahn, et al., Advances in Packet Radio Technology, Proceedings Of The IEEE (Nov. 1978).
Robert Gurwitz, et al., IEN 212: IP—Local Area Network Addressing Issues (Sep. 1982).
Robert J. Williams, User Location Service (Feb. 1996).
Robert Joseph Fowler, Decentratized Object Finding Using Forwarding Addresses, Ph.D. Thesis, University of Washington (Dec. 1985).
Robert Richardson, Internet Phone, LAN Magazine, vol. 10, No. 7 (Jul. 1995).
Robert Richardson, Pow Wow, Anyone? A Web Chat That Works, LAN Magazine, vol. No. 9 (Sep. 1995).
Robert S. French, et al., The Zephyr Programmer's Manual, Rev. 2.1 (May 5, 1989).
Rosen, Nick "Internet Opens Line on Cheap Global Phone Calls" The Guardian, Feb. 10, 1995, A1.
S. Waldbusser, et al., RFC 1742: Apple Talk Management Information Base II (Jan. 1995).
S.R. Ahuja, et al., The Rapport Multimedia Conferencing System, ACM (1988).
Sakae Okubo, et al., Draft ITU–T Recommendation H.245—Line Transmission of Non–Telephone Signals: Control Protocol for Multimedia Communication (Nov. 14, 1995).
Sakae Okubo, et al., ITU–T Recommendation H.245—Line Transmission of Non–Telephone Signals: Control Protocol for Multimedia Communcation (May 20, 1996).
Sakae Okubo, et al., Line Transmission of Non–Telephone Signals: Control Protocol for Multimedia Communications, Recommendation H245 (May 20, 1996).
Sakae Okubo, et, al., ITU–T Standardization of Audiovisual Communication Systems in ATM and LAN Environments (Apr. 17, 1996).
Sape J. Mullender, et al., Distributed Match–Making for Processes in Computer Networks (Association for Computing Machinery, 1985).
Sape Mullender, ed., Distributed Systems, ACM Press (1992).
Sapwater, E. "Webbed", 2 pages (undated).
Saruchi Mohan, Internet Phone Accepting Calls, Computerworld (Feb. 27, 1995).
Savetz, Kevin "Net as Phone" Internet World, Jul. 1995.
Schill, et al., ed., IFIP/IEEE International Conference on Distributed Platforms—Client/Server and Beyond: DCE Corba, ODP & advanced Distribution Applications, Technical University Bergakademie Freiburg (1996).
Schulzrinne, Service Conference Invitation Protocol, Internet Draft (Feb. 22, 1996).
Scott Kahn, Leave Your Message on My PC After the Beep, PC Week (Oct. 3, 1994).
Sharon Fisher, Fruits of Athena—Academic Projects Like Athen Have Given the World Its First Inkling of What Computer Interoperability is all About, Communications Week (1992).
Snell, Jason "Foiling Ma Bell" MacUser, Jul. 1995.
Speak Freely, from Q1.11 of Section 1 of the comp.speech FAQ Home Page (dated Mar. 19, 1996).
Staff Phone List (Jul. 1, 1997).
Steinberg, Bob "Will Politics Interfere With The Global Internet?" Mashpee Enterprise, Apr. 28, 1995.
Stephen A. Uhler, PhoneStation, Moving the Telephone onto the Virtual Desktop, 1993 Winter Usenix, San Diego, California (Jan. 25–29, 1993).
Steve Hamm, The Merry Pranksters, PC Week, vol. 12 No. 34 (Aug. 28, 1995).
Stuart Harris, The IRC Survival Guide: Talk to the World with Internet Relay Chat (Addison–Wesley, Feb. 1995).
Sun Microsystems, Inc., RFC 1050: RPC: Remote Procedure Call Protocol Specification Version 2 (Jun. 1988).
Surfers Can Drop Phones, Electronics Times (Feb. 16, 1995).
Susan Thomson, et al., DNS Dynamic Updates, IETF DNSIND Working Group (Jul. 1994).
T. Berners–Lee, et al., RFC 1738: Uniform Resource Locators (URL) (Dec. 1994).
Tamila Baron, Hearing Voices on the Net, Communication Week (Feb. 20, 1995).
Tamila Baron, VocalTec, Motorola Team Up for Internet Phone and Modem Bundle, Communications Week, No. 549 (1995).
Ted Anderson's Email to dmackey re DCE 1.1 Delegation Proposal for Review, Jun. 23, 1992.
Ted Anderson's Email to pato, Re: RFC 7.0 (really glp92), Jul. 21, 1992.
The 4.4BSD–Lite distribution announcement, Computer Systems Research Group (Mar. 1, 1994) and related newsgroup postings, dated Apr. 21–22, 1994.
The Electric Magic Company, Business Plan, Version 0.1 draft, Apr. 17, 1995.
The Open Group Organization Chart (Oct. 1997).
The Open Group Organization Chart Oct. 1996 (Confedential).
The OSF Distributed Computing Environment: Building on International Standards, OSF White Paper (Apr. 1992).

The VocalChat User's Guide, Sep. 28, 1993.

Thomas Maresca, The Internet Phone Company?, Consumer Information Appliance, No. 55 (Feb. 1995).

TIMOP: DCE Time Operations Sample Application. (undated).

Timothy J. O'Malley, Analysis of the Zephyr Communication Paradigm, Bachelor of Science in Computer Science and Engineering, Thesis, Massachusetts Institute of Technology (May 1993).

Todd Copilevitz, Heard on the Internet, The Star–Ledger (Mar. 7, 1995).

Tom Lyons, Network Computing System Tutorial, Prentice Hall (1991).

Tony Pompili, VocalTec: The Internet Phone Number?, PC Magazine (May 16, 1995).

Translation of Japanese Patent Application No. Sho 63[1988]–131637 (Original dated Jun. 3, 1988).

Transparencies: Walter Tuvell, DCE 1.0 Security Technology—Detailed Architectural Overview (Feb. 1997).

V. Jacobson, et al., RFC 1185: TCP Extension for High–Speed Paths (Oct. 1990).

VocalChat 1.01 Network Information (undated).

VocalChat Early Beta Release 1.02B Information (undated).

VocalChat GTI 2.12 Beta Retrival Instructions and Information (undated).

VocalChat Version 1.0, README.TXT, Nov. 1993.

VocalChat Version 1.01, README.TXT, Mar. 1994.

VocalChat Version 2.01 and Wan 2.01 README.TXT. May 1994.

VocalTec Annual Report, 1996.

VocalTec Cross–Reference Sheet, Pursuant to Item 501 of Reg. S–K (dated Jan. 1996).

VocalTec Internet Phone Information Sheet, 2 pages. (dated Jun. 1995).

VocalTec Internet Phone Version 3.0 Build 17, README.TXT, Aug. 11, 1995.

VocalTec Internet Phone Version 3.2 Build 21, README.TXT, Mar. 25, 1996.

VocalTec SEC 20–F Filing, 1996.

VocalTec SEC F–1 Filing, Dec. 22, 1995.

VocalTec SEC F–1 Filing, Jan. 5, 1996.

Voice Over the Internet, Boardwatch Magazine, vol. IX, No. 1 (Jan. 1995).

W. David Albrecht, CPA Firms on the World Wide Web, Ohio CPA Journal (Jun. 1996).

W. Simpson, RFC 1661: The Point–to–Point Protocol (PPP) (Jul. 1994).

W. Yeong, et al., RFC 1777. Lightweight Directory Access Protocol (Mar. 1995).

Walt and mactcp's ip addresses and code (undated).

Walter Tuvell, DCE 1.0 Security Technology—Detailed Architectural Overview (Feb. 1997).

Walter Tuvell, DCE 1.0 Security Technology Detailed Architectural Overview, Draft (Feb. 1997).

Walter Tuvell, DCE 1.0 Security Technology: Detailed Architectural Overview (Feb. 1997).

Walter Tuvell, DCE 1.0 Security Technology: Detailed Architectural Overview (May 1994).

Walter Tuvell, DCE Multi–Crypto Support—Proposal to NSA for Funding and Exportability of Multiple Cryptographic Mechanisms in OSF's Distributed Computing Environment (Sep. 12, 1995).

Walter Tuvell, Distribution & The Infobahn (1996).

Walter Tuvell, Exportability of DCE Multi–Crypto Feature (Mar. 5, 1996).

Walter Tuvell, RFC 98.0: Challenges Concerning Public–Key in DCE (Dec. 1996).

Walter Tuvell, System V/ONC Comparison to AIX/NCS (Oct. 3, 1988).

Walter Tuvell, The DCE Dance: Application Development in 29 Easy Steps (Sep. 1991).

Walter Tuvell, The OSF Distributed Computing Environment (DE). (undated).

Web Phone, from Q1.11 of Section 1 of the comp.speech FAQ Home Page (dated Mar. 19, 1996).

WebSTAR Technical Reference (formerly MacHTTP), StarNine Technologies, 1995.

Wei Hu, DCE Security Programming, O'Reilly & Associates (Jul. 1995).

Welch, Nathalie "Vendors Ring in New Telephony Options" MacWeek, Apr. 10, 1995, p. 18.

Wendy Woods, Newsbytes Daily Summary, Newsbytes (Jun. 10, 1994).

William M. Bulkeley, On–line: Hello, world. Audible Chats on the Internet, Wall Street Journal (Feb. 10, 1995).

Winther, Mark. "The World Wide Web Phones Home: Internet Telephony Market Assessment, 1996–1999", International Data Corporation White Paper (dated 1996).

Xerox System Integration Standard Clearinghouse Protocol (Apr. 1984).

Yakov Rekhter, et al., Dynamic Updates in the Domain Name System (DNS):Architecture and Mechanism, Internet–Draft, DNSIND Working Group (Jul. 15, 1994).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 and 6-8 is confirmed.

Claims 4-5 and 9-15 were not reexamined.

\* \* \* \* \*